(12) United States Patent
Kim et al.

(10) Patent No.: US 8,610,663 B2
(45) Date of Patent: Dec. 17, 2013

(54) PORTABLE DEVICE AND METHOD FOR CONTROLLING THE SAME

(75) Inventors: Yongsin Kim, Seocho-gu (KR); Jihwan Kim, Seocho-gu (KR); Jihyun Kim, Seocho-gu (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 13/367,058

(22) Filed: Feb. 6, 2012

(65) Prior Publication Data

US 2013/0201093 A1    Aug. 8, 2013

(51) Int. Cl.
*G09G 5/00*    (2006.01)

(52) U.S. Cl.
USPC .......................................................... 345/156

(58) Field of Classification Search
USPC .......................................... 345/156, 173–183
See application file for complete search history.

(56) References Cited

U.S. PATENT DOCUMENTS

| | | | |
|---|---|---|---|
| 5,708,460 A * | 1/1998 | Young et al. | 345/173 |
| 6,243,075 B1 * | 6/2001 | Fishkin et al. | 345/156 |
| 7,456,823 B2 * | 11/2008 | Poupyrev et al. | 345/173 |
| 8,082,003 B2 * | 12/2011 | Jee | 455/556.1 |
| 2003/0227441 A1 * | 12/2003 | Hioki et al. | 345/156 |
| 2006/0227114 A1 * | 10/2006 | Geaghan et al. | 345/173 |
| 2006/0279548 A1 * | 12/2006 | Geaghan | 345/173 |
| 2007/0091068 A1 * | 4/2007 | Liberty | 345/157 |
| 2007/0247422 A1 * | 10/2007 | Vertegaal et al. | 345/156 |
| 2008/0180399 A1 * | 7/2008 | Cheng | 345/173 |
| 2009/0184921 A1 * | 7/2009 | Scott et al. | 345/156 |
| 2010/0011291 A1 * | 1/2010 | Nurmi | 715/702 |
| 2010/0029327 A1 * | 2/2010 | Jee | 455/556.1 |
| 2010/0045705 A1 * | 2/2010 | Vertegaal et al. | 345/661 |
| 2010/0056223 A1 * | 3/2010 | Choi et al. | 455/566 |
| 2010/0117975 A1 * | 5/2010 | Cho | 345/173 |
| 2010/0207745 A1 | 8/2010 | Kim et al. | |
| 2011/0095975 A1 * | 4/2011 | Hwang et al. | 345/156 |
| 2011/0187681 A1 * | 8/2011 | Kim et al. | 345/204 |
| 2012/0260220 A1 | 10/2012 | Griffin | |

FOREIGN PATENT DOCUMENTS

| | | |
|---|---|---|
| KR | 10-2010-0093211 A | 8/2010 |
| KR | 10-2011-0114439 A | 10/2011 |
| KR | 10-1097826 B1 | 12/2011 |

OTHER PUBLICATIONS

Hinckley et al, "Sensor Synaesthesia: Touch in Motion, and Motion in Touch" CHI 2011, May 7-12, 2011, Vancouver, BC, Canada, pp. 1-10.*

* cited by examiner

*Primary Examiner* — Dorothy Harris
(74) *Attorney, Agent, or Firm* — Birch, Stewart, Kolasch & Birch, LLP

(57) ABSTRACT

A method for controlling a portable device is provided. The method includes detecting bending of the portable device and determining whether to perform motion sensing correction due to the bending; acquiring a motion sensing correction factor for performing the motion sensing correction due to the bending; performing motion sensing correction of at least one motion sensor using the motion sensing correction factor; and controlling the portable device according to the corrected motion sensing.

16 Claims, 17 Drawing Sheets

(a)

(b)

(c)

(a)

(b)

(c)

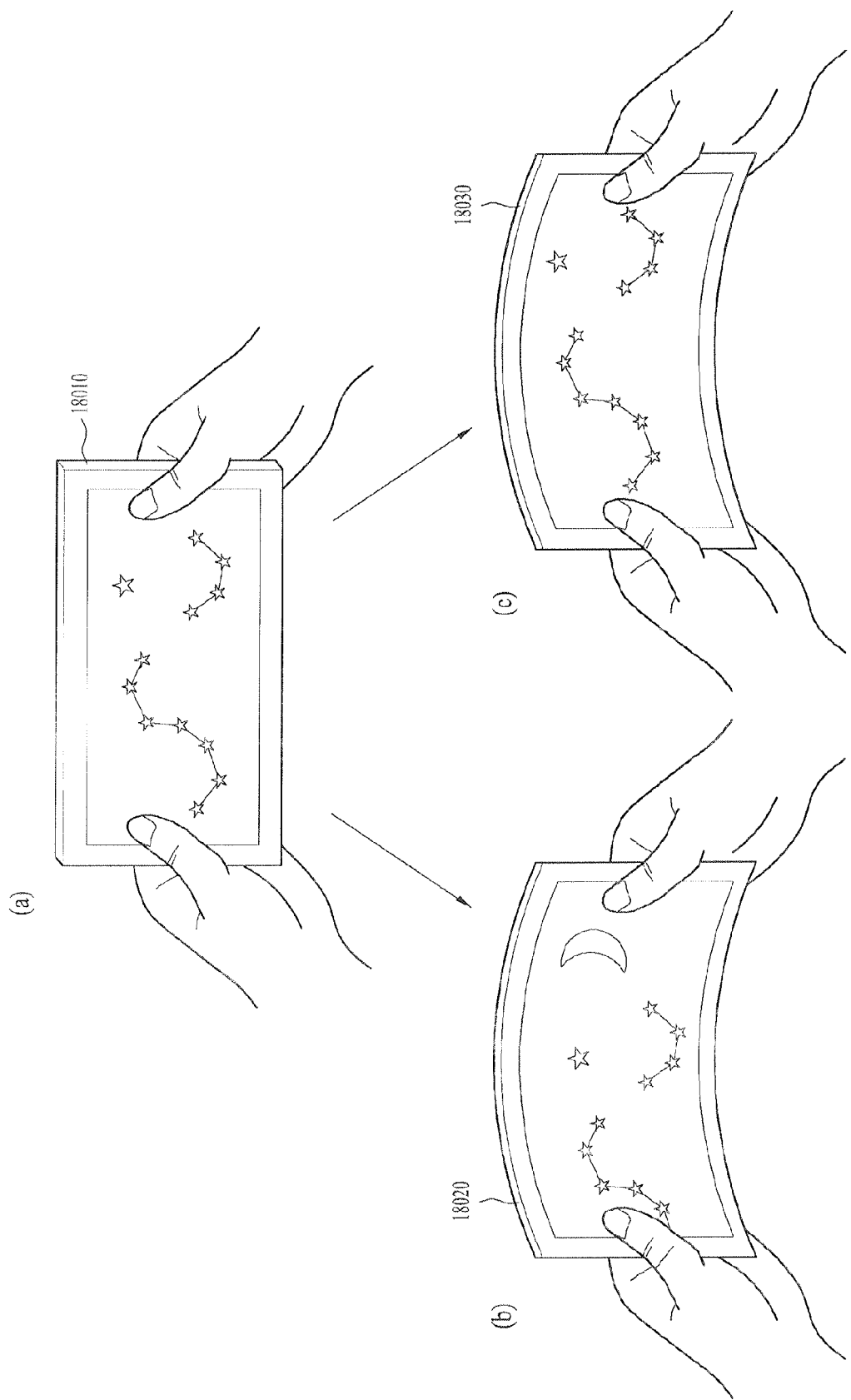

PORTABLE DEVICE AND METHOD FOR CONTROLLING THE SAME

BACKGROUND OF THE INVENTION

1. Field of the Invention

The present invention relates to a portable device, and more particularly, to a portable device including a flexible display and a method for controlling the portable device.

2. Discussion of the Related Art

Mobility has always been an important issue with regard to use of electronic devices. Not only cellular phones but also various other portable electronic devices having performance comparable to desktop computers have entered the market recently. Such portable electronic devices have been reduced in size and weight to allow users to use a variety of digital information while in motion.

The portable device performs various functions in addition to basic conventional functions such as data transmission and reception. Thus, the portable device needs to be able to be more easily and more correctly controlled by the user. Especially, recent portable devices include various sensors to identify an operation of the device or an operation performed for the device and to perform control corresponding to the identified operation. The degree of identification and sensitivity of sensors has increased along with development of such technology.

SUMMARY OF THE INVENTION

Accordingly, the present invention is directed to a portable device and a method for controlling the same that substantially obviate one or more problems due to limitations and disadvantages of the related art.

An object of the present invention is to provide a portable device and a method for controlling the same which allow the user to more easily and more correctly control the device.

Another object of the present invention is to provide a portable device and a method for controlling the same wherein it is possible to perform additional control according to flexibility of the portable device when the portable device includes a flexible display or when the portable device is flexible.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a portable device includes detecting bending of the portable device and determining whether or not there is a need to perform motion sensing correction due to bending when the bending has been detected, acquiring a motion sensing correction factor when there is a need to perform motion sensing correction due to bending, correcting motion sensing of a motion sensor using the motion sensing correction factor, and controlling the portable device according to the corrected motion sensing.

In another aspect of the present invention, a portable device includes a bending sensor for detecting bending of the portable device, a motion sensor for sensing a movement of the portable device or a movement with reference to the portable device, and a controller for determining whether or not there is a need to perform motion sensing correction due to the bending of the portable device when the bending has been detected by the bending sensor, wherein the controller acquires a motion sensing correction factor when there is a need to perform motion sensing correction due to the bending, corrects motion sensing of the motion sensor using the motion sensing correction factor, and controls the portable device according to the corrected motion sensing of the motion sensor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 18 illustrates a control operation of a device according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although most terms of elements in the present invention have been selected from general ones widely used in the art taking into consideration functions thereof in the invention, the terms may be changed depending on the intention or convention of those skilled in the art or the introduction of new technology. Some terms have been arbitrarily selected by the applicant and their meanings are explained in the following description as needed. Thus, the definitions of the terms used in the invention should be determined based on the whole content of this specification together with the intended meanings of the terms rather than their simple names or meanings.

Digital devices have been decreased in size through development of electronic device manufacturing technology. The present invention relates to mobile, portable electronic devices which will be collectively referred to as portable devices. Portable devices include a variety of mobile electronic devices, examples of which include electronic devices such as a cellular phone, a Personal Digital Assistant (PDA), a laptop, a tablet PC, an MP3 player, a CD player, and a DVD player. In the following description, the portable devices may also be referred to as a device for short.

Figure 1:
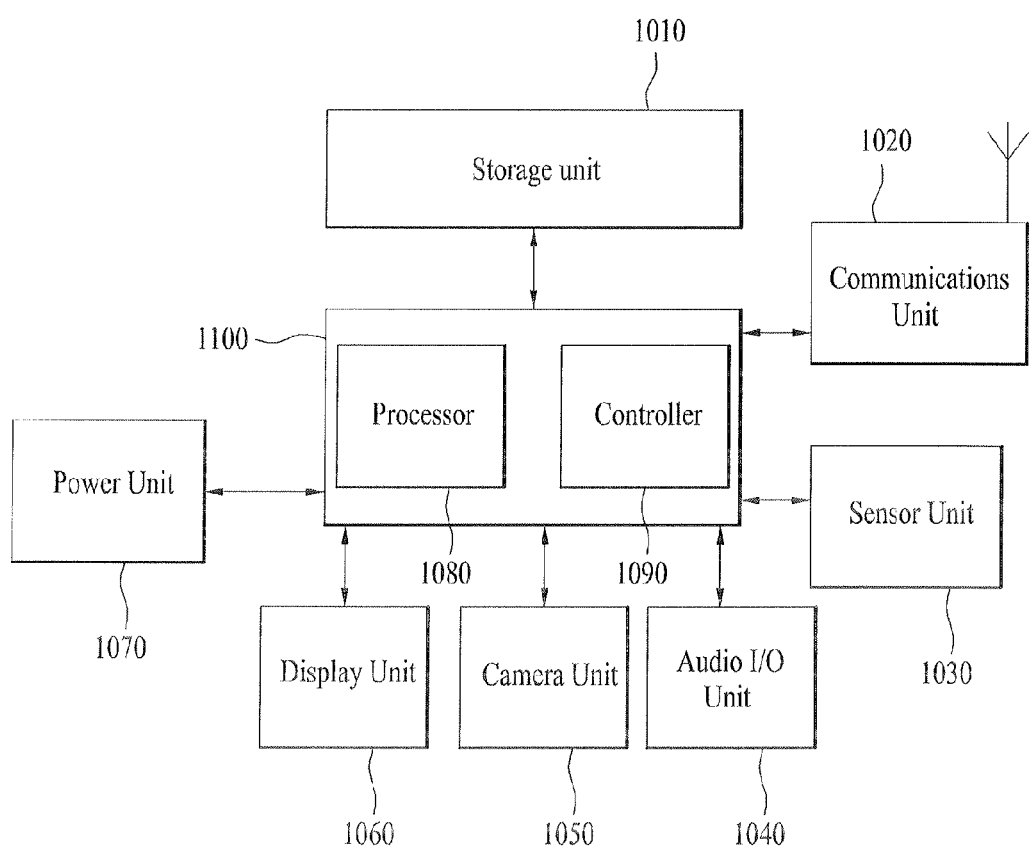
FIG. 1 is a block diagram illustrating a portable device according to an embodiment of the present invention.

FIG. 1 is a block diagram illustrating a portable device according to an embodiment of the present invention.

As shown in FIG. 1, the portable device includes a storage unit 1010, a communications unit 1020, a sensor unit 1030, an audio I/O unit 1040, a camera unit 1050, a display unit 1060, a power unit 1070, a processor 1080, and a controller 1090.

The storage unit 1010 may store a variety of digital data such as video, audio, photographs, moving images, and applications. The storage unit 1010 is one of a variety of digital data storage spaces such as a flash memory, a Hard Disk Drive (HDD), and a Solid State Drive (SSD).

The communications unit 1020 may perform communication with an external entity using various protocols to transmit and/or receive data. The communications unit 1020 may connect to an external network wirelessly or by wire to transmit and/or receive digital data.

The sensor unit 1030 may identify user environments or user inputs using a plurality of sensors provided in the portable device and deliver the identified environments or user inputs to the controller 1090. The sensor unit 1030 may include a variety of sensing means. For example, the plurality of sensing means may include a gravity sensor, a geomagnetic sensor, a motion sensor, a gyro sensor, an acceleration sensor, a inclination sensor, a brightness sensor, a height sensor, an odor sensor, a temperature sensor, a depth sensor, a pressure sensor, a bending sensor, an audio sensor, a video sensor, a Global Positioning System (GPS) sensor, and a touch sensor. The sensor unit 1030, which is a term collectively referring to the variety of sensing means, may sense and deliver a variety of user inputs and user environments to allow the device to perform corresponding operations. The sensors may be included as additional elements in the device or may be combined into at least one element and included in the device.

The audio I/O unit 1040 may include an audio output means such as a speaker and an audio input means such as a microphone and may perform audio input and audio output. The audio I/O unit 1040 may also be used as an audio sensor.

The camera unit 1050 may capture still images and moving images and may optionally be provided in the device depending on the embodiment of the device. The camera unit 1050 may also be used as the motion sensor or the video sensor.

The display unit 1060 may display an image on a screen. The display unit 1060 may be used as the touch sensor when the display is a touch sensing display and may be used as the bending sensor when the device is flexible.

The power unit 1070 may be a battery provided in the device or a power source connected to an external power source and may supply power to the device.

The processor 1080 may execute a variety of applications stored in the storage unit 1010 and may process data in the device.

The controller 1090 may control the units of the device and may manage data transmission and reception between the units.

The processor 1080 and the controller 1090 may be implemented as a single chip to perform the operations described above together. This single chip may be referred to as a controller 1090 in the following description.

The elements of the portable device are shown as logically separate blocks in FIG. 1, which is a block diagram of the portable device according to an embodiment of the present invention. The elements of the device may be mounted as a single chip or a plurality of chips in the device depending on design of the device.

Recently, the portable device may include a plurality of sensors which can identify a variety of motions of the device. Since the portable device can identify a variety of motions, the portable device may be used for various purposes other than the basic functions such as data transmission and reception and display functions. For example, the portable device may be used as a remote control that controls an external device or a game pad, which can be used to enjoy a game, and various applications and various programs in association with motions that can be identified by the portable device have also been suggested.

Figure 2:
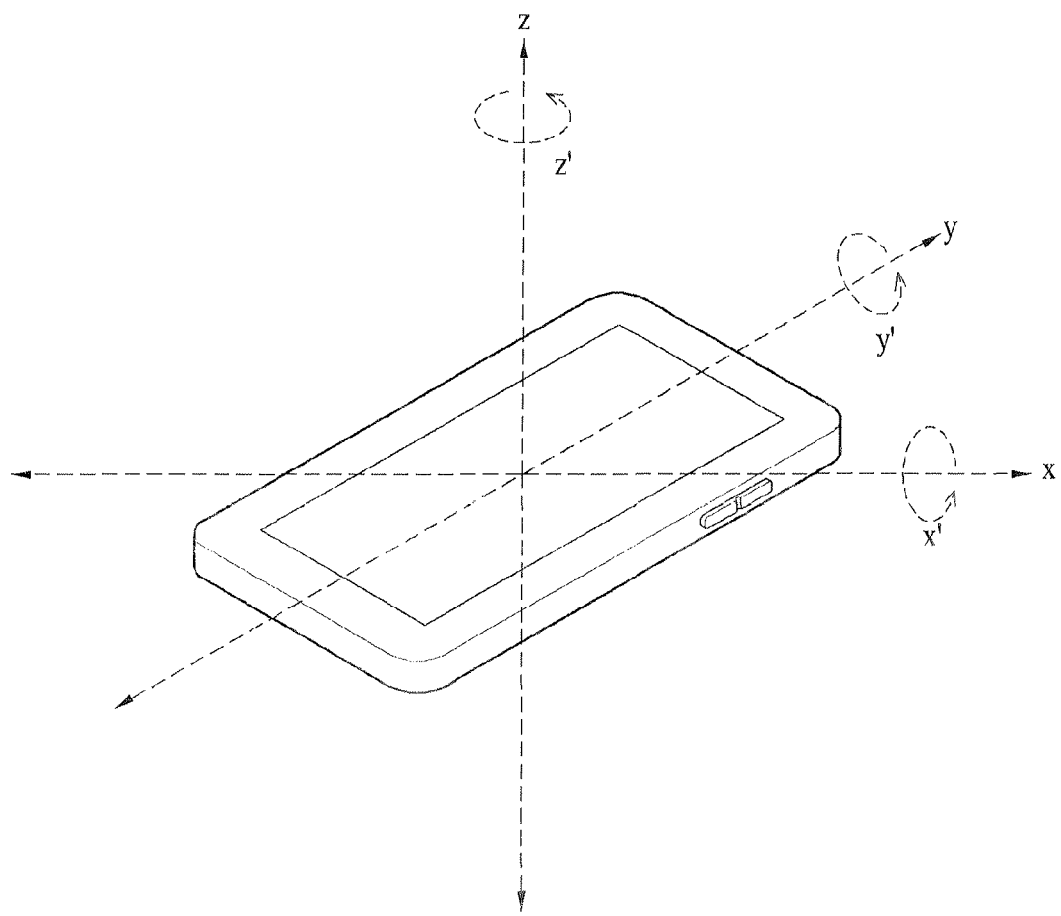
FIG. 2 illustrates a portable device according to an embodiment of the present invention.

FIG. 2 illustrates a portable device according to an embodiment of the present invention.

The portable device may sense or identify movements of the device using the sensors as described above. The following is a description of movements that the device of FIG. 2 identifies using the sensors included in the sensor unit of FIG. 1.

The portable device may include a gravity sensor. The gravity sensor is a sensor that senses gravity applied to the device to identify a rotation state of the device. As shown in FIG. 2, when the device rotates about an x axis or a y axis, the gravity sensor may deliver a corresponding electrical signal to the controller and the controller may perform display/operation control according to rotation of the device.

The gravity sensor may also be used as a tilt angle sensor. The tilt angle sensor detects slope of the device with respect to the direction of gravity of the Earth and includes a sensor in which a pendulum is mounted in the direction of the angle input axis of the angle sensor. In an embodiment, the tilt angle sensor may employ a displacement scheme in which the sensor outputs the angle of the pendulum, which indicates the direction of gravity, from the reference axis and a torque balance scheme in which torque generated by applying an electric current to an electric coil and torque generated by the slope of the pendulum are balanced to allow the pendulum to always be located at the zero position.

The portable device may include a geomagnetic sensor. The geomagnetic sensor may sense a magnetic field generated from the Earth to detect orientation of the device in the same manner as a compass. In FIG. 2, the geomagnetic sensor may sense orientation in the x-y plane and the device may perform display/operation control according to the sensed orientation.

The portable device may include an acceleration sensor. The acceleration sensor may process an output signal and measure acceleration, vibration, or applied force such as impact. That is, the acceleration sensor may sense a change of velocity in a specific direction and may output a corresponding electrical signal. In the embodiment of FIG. 2, the acceleration sensor can detect movement of the device in an arbitrary direction. For example, when force is applied to the device, which is stationary or in motion, to accelerate the device in an arbitrary direction, the acceleration sensor may sense the acceleration and output a corresponding electrical signal and the device may perform display/operation control using the electrical signal. In an embodiment of the present invention, the acceleration sensor may sense acceleration or acceleration change in an arbitrary direction in the x, y, and z axes.

The portable device may include a gyro sensor. The gyro sensor is a sensor that indicates an angle of rotation of an object per unit time. That is, the gyro sensor senses the angular speed of an object. While the acceleration sensor may sense acceleration and acceleration change in a linear direction, the gyro sensor may sense acceleration and acceleration change in a rotational direction. In the embodiment of FIG. 2, when the device rotates about an arbitrary one of the x, y, and z axes, the gyro sensor may sense and output the angular speed of rotation of the device and the device may perform display/operation control using the angular speed.

The sensors described above may be included in a handheld device and may sense motions of the device or motions with respect to the device. Each of these sensors, which senses a motion of a user or an environment with respect to the device and a motion of the device and generates a corresponding electrical signal, may be referred to as a motion sensor. In an embodiment, the sensors such as the geomagnetic sensor, the acceleration sensor, and the gyro sensor may be constructed into a single chip to detect a motion of the device. In another embodiment, the sensors described above may be implemented as different chips and values sensed by the sensors may be combined to detect a motion of the device. In this case, the sensors that sense motions of the device or motions with respect to the device may also be collectively referred to as a motion sensor. In the following description, it is assumed for ease of explanation that the sensors described above are located at a single position of the device and the sensors are collectively referred to as a motion sensor.

Figure 3:
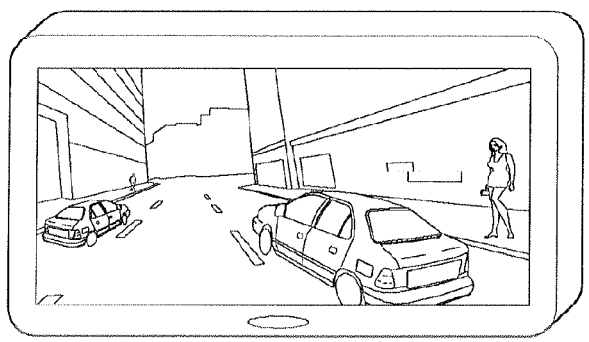
FIG. 3 illustrates a display control operation of the portable device according to an embodiment of the present invention.
Figure 3:
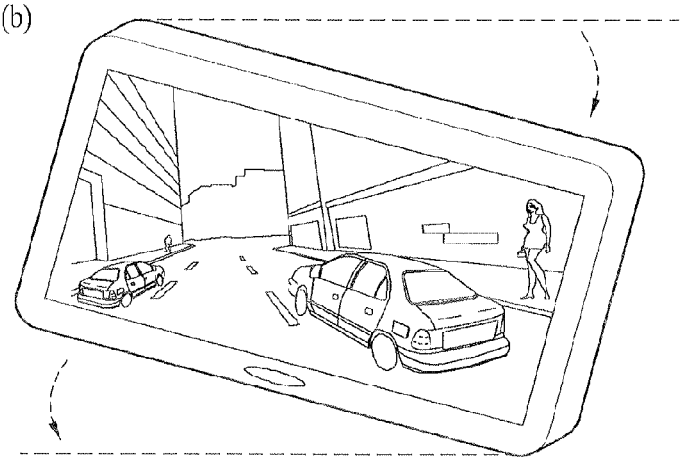
Figure 3:
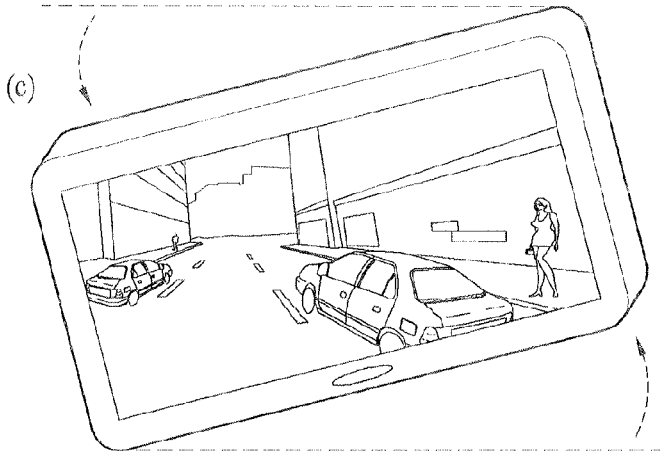

FIG. 3 illustrates a display control operation of the portable device according to an embodiment of the present invention.

FIG. 3(a) illustrates an example in which an image is displayed on a screen of a display provided on a front side of the device. While the image is being displayed, the user may rotate the device in a clockwise direction or in a counterclockwise direction as described above with reference to FIG. 2. Especially, when an image of a game application is being displayed, the user can control the direction of a vehicle within the image by rotating the device as when operating a car handle. In this case, if the image is rotated together with the device, user inconvenience is caused since the user cannot view the image horizontally.

Thus, the device may sense the slope and angular speed of the device and adjust the display according to the sensed slope and angular speed and also reflect the sensed slope and angular speed in the game application.

FIG. 3(b) illustrates an example in which the user has rotated the device in a clockwise direction. The device may sense the rotated angle and angular speed of the device using the motion sensor and may display the image horizontally with respect to the user according to the sensed rotated angle and angular speed. That is, the displayed image is rotated to the opposite direction by the same angle by which the device is rotated to allow the user to continue to view the horizontal image regardless of rotation of the device. The device may also sense the rotated angle and angular speed of the device and reflect the sensed rotated angle and angular speed in the game application. That is, the game application that is being executed by the processor of the device may control a car within the game to be displayed such that the car is driven according to the rotated angle and angular speed sensed by the motion sensor.

FIG. 3(c) illustrates an example in which the user has rotated the device in a counterclockwise direction. A detailed description of FIG. 3(b) is omitted herein since it is similar to the description of FIG. 3(a) except for the direction.

Figure 4:
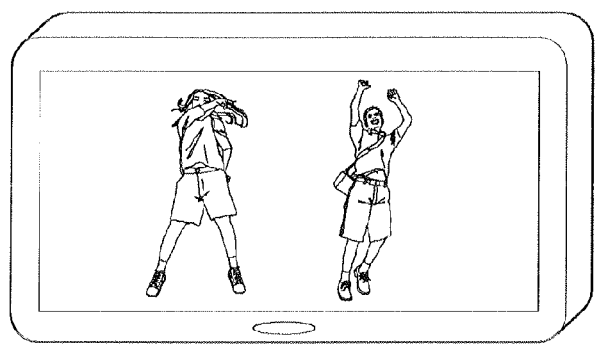
FIG. 4 illustrates a display control operation of a portable device according to another embodiment of the present invention.
Figure 4:
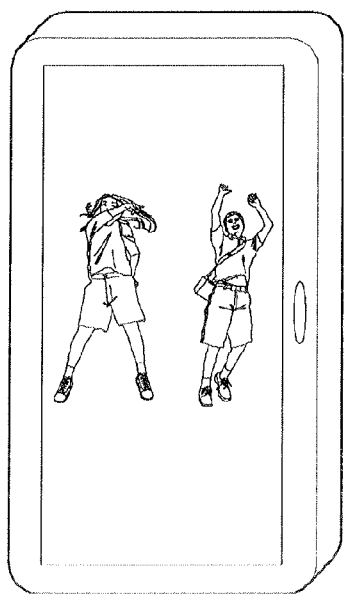
Figure 4:
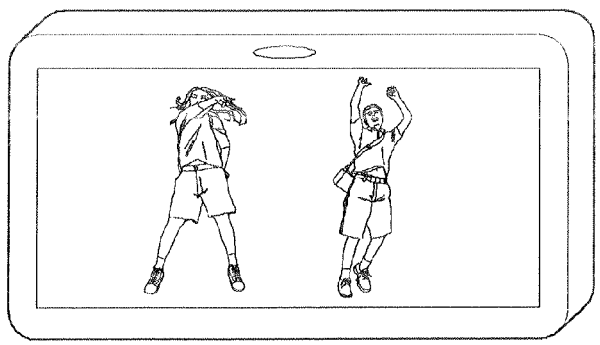

FIG. 4 illustrates a display control operation of a portable device according to another embodiment of the present invention.

FIG. 4(a) illustrates an example in which an image is displayed on a screen of a display provided on a front side of the device. While the image is being displayed, the user may rotate the device in a counterclockwise direction as described above with reference to FIG. 2 or may turn the device in an arbitrary direction.

FIG. 4(b) illustrates an example in which the device is rotated by 90 degrees and FIG. 4(c) illustrates an example in which the device is rotated by 180 degrees in a clockwise direction or in a counterclockwise direction. The device may sense the rotated angle of the device and detect that the device has been turned over using the motion sensor. The device may perform display control according to the rotated angle or in response to the turning of the device. That is, the device may rotate or invert the displayed image to allow the user to view the image horizontally.

Figure 5:
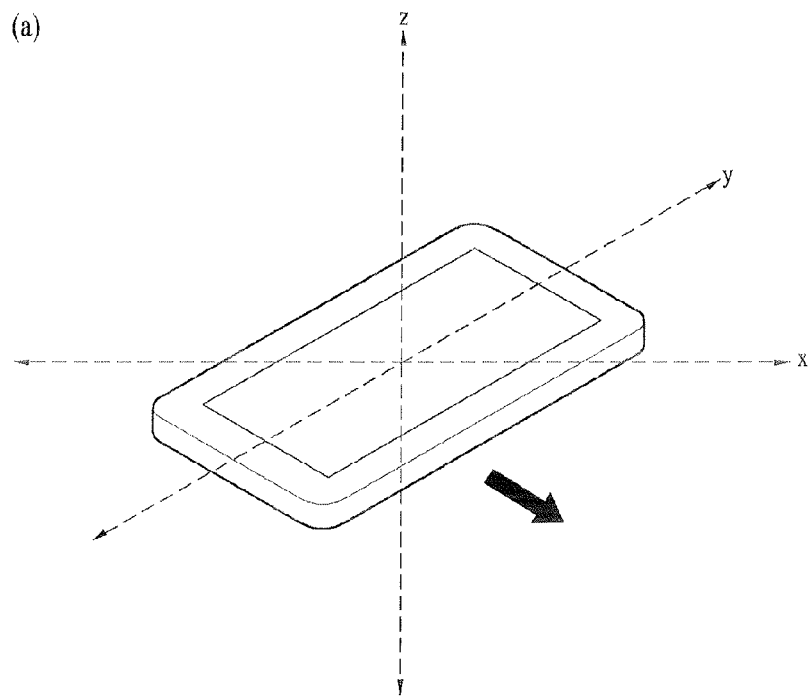
FIG. 5 illustrates a control operation of a portable device according to an embodiment of the present invention.
Figure 5:
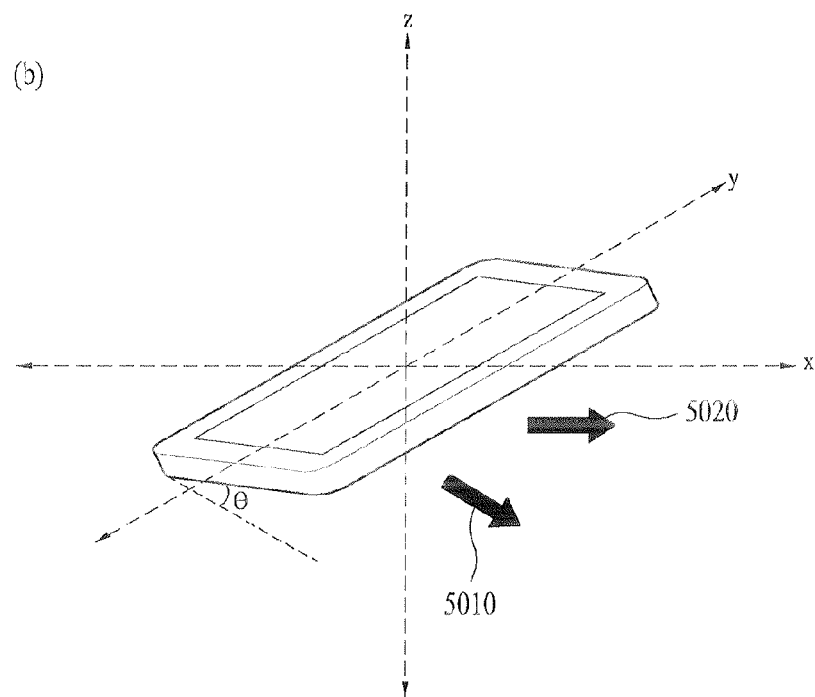

FIG. 5 illustrates a control operation of a portable device according to an embodiment of the present invention.

Although FIGS. 3 and 4 have been described with reference to an example in which the device is rotated, the device may also move in a specific direction as shown in FIG. 5.

FIG. 5(a) illustrates an example in which the device moves to the right. The device may acquire the movement direction and acceleration of the device using the motion sensor and may control the elements of the device or an application using the acquired direction and acceleration.

The user may not move the device while holding the device in a horizontal direction as shown in FIG. 5(a). For example, the user may move the device to the right with the device being rotated by an angle of θ in a counterclockwise direction as shown in FIG. 5(b). In this case, the device may sense the rightward movement of the device as a movement in a rightward direction 5010 as originally intended or may identify the rightward movement of the device as a movement in an upward-right direction 5020 which is inclined by the angle θ.

In this case, the device needs to correct the sensed motion direction to a direction needed for the device or the application. For example, the device may identify only the horizontal movement as a user input command in a current operating mode of the device or in a currently running application. Here, the device may extract only an x-direction movement from the movement in the inclined direction 5020 and reflect the x-direction movement in operation of the device.

Thus, the device needs to use the sensed values after combining or correcting the values rather than directly using the sensed values. For example, the device corrects a sensed acceleration value using the sensed inclination angle and reflects the corrected value in operation of the device as shown in FIG. 5(*b*).

Values sensed by sensors, which are to be additionally corrected, and a method for correcting the sensed values when the display or device is flexible are described below.

Recently, a flexible display has been commercialized and technologies for controlling operation of a device when a flexible display of the device is bent have been developed. In a flexible device, a substrate is also made of a flexible substance to allow bending of the device itself. The substrate of the flexible device may be made of a metal foil, very thin glass, or a plastic substrate. Especially, when the substrate of the device is made of plastic, a PC substrate, a PET substrate, a PES substrate, a PI substrate, a PEN substrate, an AryLite substrate, or the like may be used. A device which is partially or fully flexible, such as a device including a flexible display, a handheld device which is flexible, a device which is partially flexible, or a device including a flexible display which can be extended, may be simply referred to as a device for ease of explanation.

Figure 6:
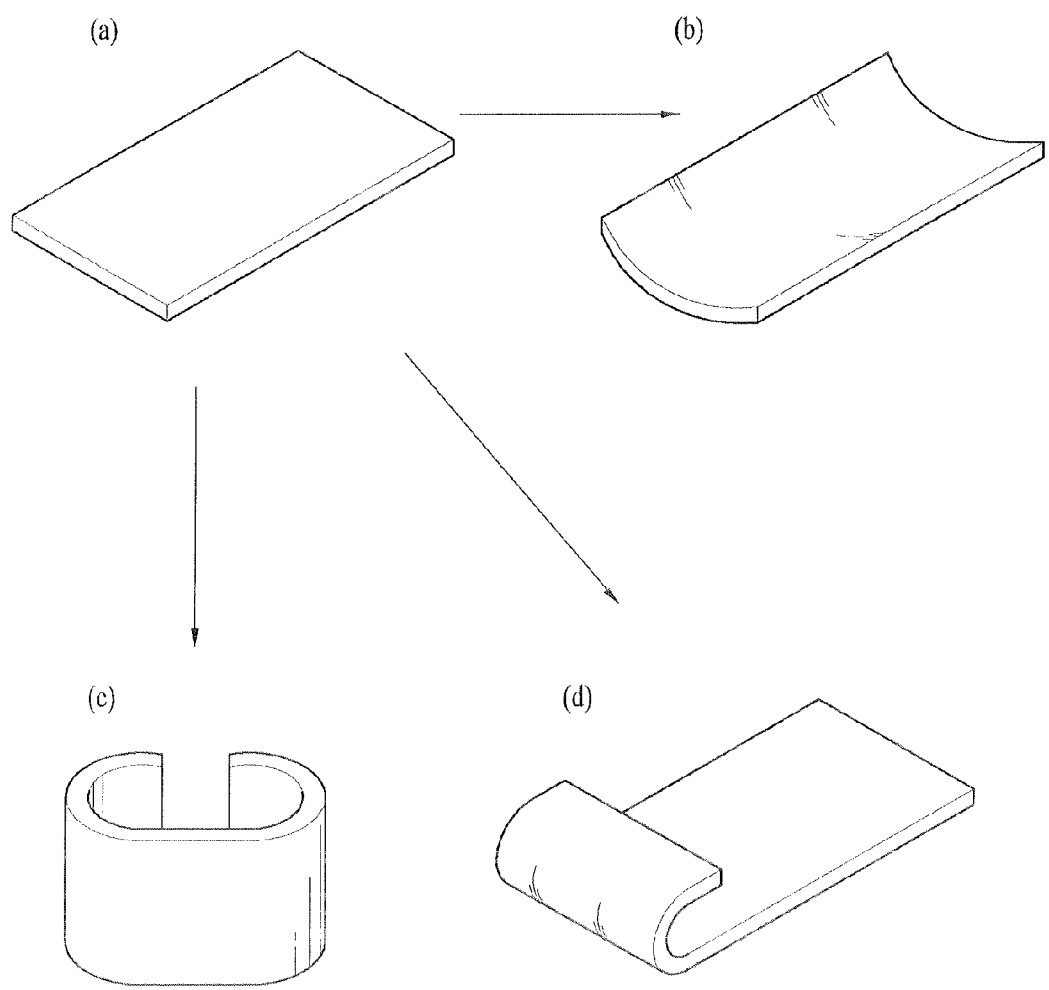
FIG. 6 illustrates a flexible display or a flexible device according to an embodiment of the present invention.

FIG. 6 illustrates a flexible display or a flexible device according to an embodiment of the present invention.

Specifically, FIGS. 6(*a*) to (*d*) illustrate various bent forms of a flexible display. FIGS. 6(*a*) to (*d*) may also illustrate a flexible portable device which includes a flexible display. The following description will be given with reference to a flexible portable device as an example.

Although the flexible portable device is illustrated in simple forms in FIG. 6 and subsequent figures, the device includes the same units as illustrated in FIG. 1.

FIG. 6(*a*) illustrates a flexible portable device which has not been bent. The flexible portable device may be classified into a bendable device as shown in FIG. 6(*a*), a rollable device as shown in FIG. 6(*c*), and a foldable or paper-like device as shown in FIG. 6(*d*) depending on flexibility thereof.

In the case in which the device is bent as shown in FIGS. 6(*b*) to 6(*d*), an error may occur when the device operates according to sensing results of the motion sensor. Specifically, a different motion of the device from an actually performed motion may be detected when a portion of the device including the motion sensor has been bent relative to the form of the device shown in FIG. 6(*a*).

Figure 7:
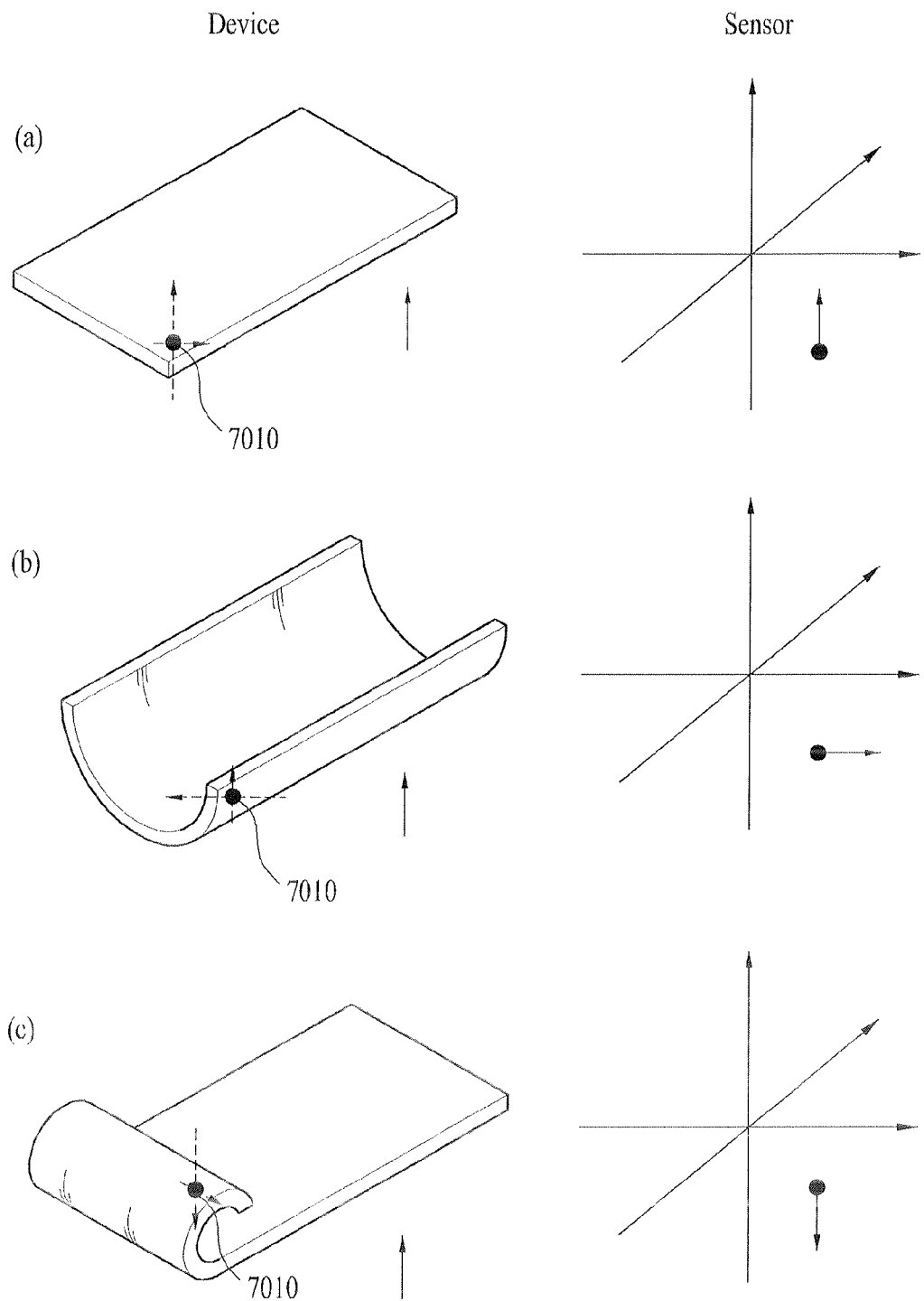
FIG. 7 illustrates a motion sensing operation of a flexible portable device according to an embodiment of the present invention.

FIG. 7 illustrates a motion sensing operation of a flexible portable device according to an embodiment of the present invention.

Specifically, FIG. 7 illustrates how the motion sensor senses a movement of the device when the user moves the device in an upward direction in the z axis. The left part of FIG. 7 shows a bent form of the flexible device and the right part shows a motion of the flexible device which is sensed and/or detected by the motion sensor while the device is bent. In this example, the motion sensor 7010 is located at a right lower portion of the device as shown in FIG. 7.

In the left parts of FIGS. 7(*a*) to 7(*c*), dotted arrows indicate reference directions of the motion sensor 7010. A long dotted arrow indicates a reference up-down direction of the motion sensor and a short dotted arrow indicates a reference left-rightward direction of the motion sensor.

When the device moves in an upward direction in the z axis as shown in the left part of FIG. 7(*a*), the motion sensor 7010 may sense a movement of the device in an upward direction in the z axis as shown in the right part of FIG. 7(*a*). However, due to bending, the motion sensor 7010 may sense a movement of the device in a different direction from the upward direction as shown in FIGS. 7(*b*) and 7(*c*).

First, when the flexible device is bent as shown in FIG. 7(*b*), the motion sensor may rotate by about 90 degrees in a counterclockwise direction due to bending of the device. The reference direction of the motion sensor also changes as shown in FIG. 7(*b*). Accordingly, even though the device has moved in an upward direction in the z axis as shown in the left part of FIG. 7(*b*), the motion sensor may sense the device as moving in a rightward direction in the x axis as shown in the right part of FIG. 7(*b*).

In addition, when the flexible device is folded as shown in FIG. 7(*c*), the motion sensor may rotate by about 180 degrees in the y-axis direction due to bending of the device. The reference direction of the motion sensor also changes as shown in FIG. 7(*c*). Accordingly, even though the device has moved in an upward direction in the z axis as shown in the left part of FIG. 7(*c*), the motion sensor may sense the device as moving in a downward direction in the z axis as shown in the right part of FIG. 7(*c*).

Figure 8:
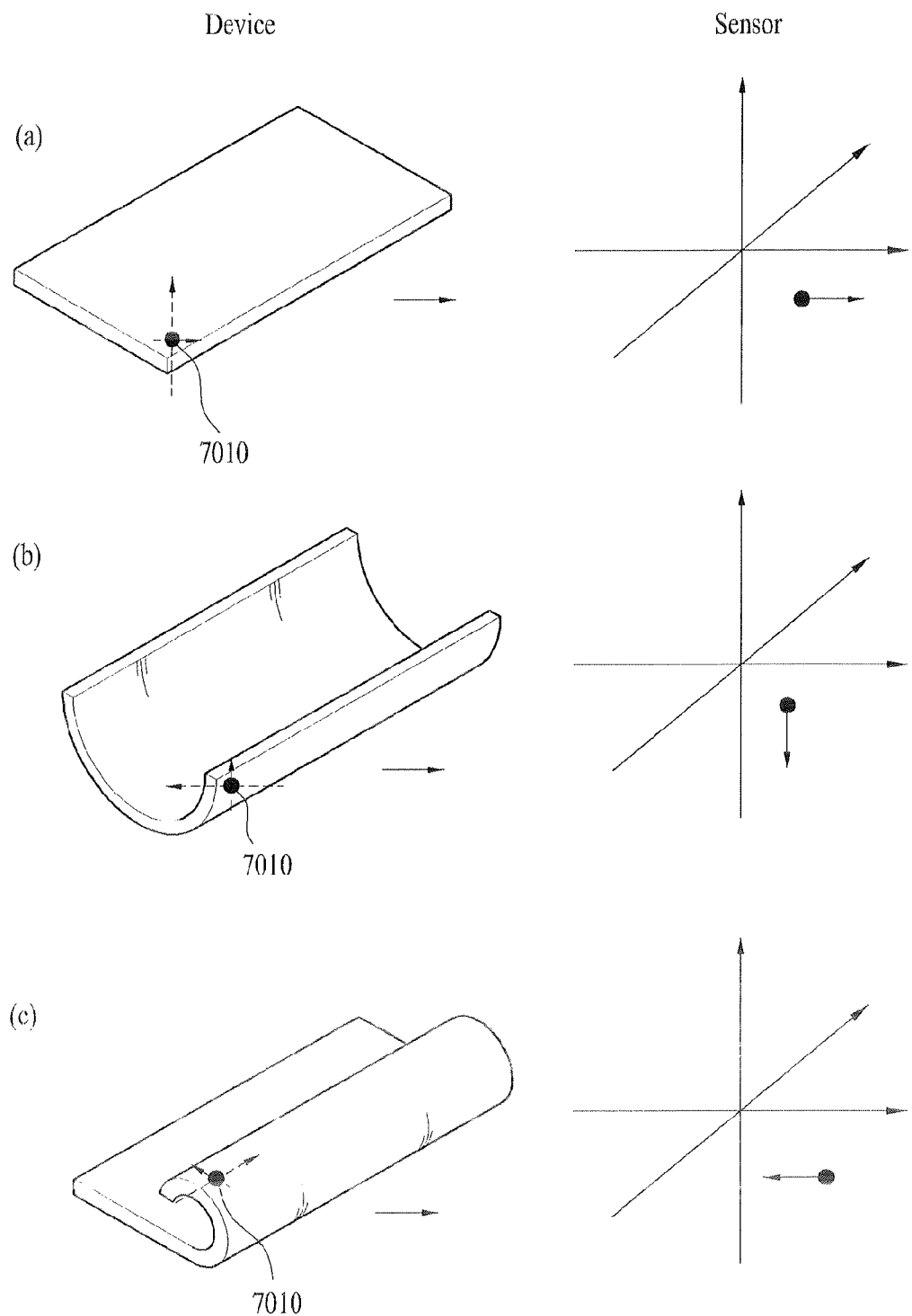
FIG. 8 illustrates a motion sensing operation of a flexible portable device according to another embodiment of the present invention.

FIG. 8 illustrates a motion sensing operation of a flexible portable device according to another embodiment of the present invention.

Specifically, FIG. 8 illustrates how the motion sensor senses a movement of the device when the user moves the device in a rightward direction in the x axis. The left part of FIG. 8 shows a bent form of the flexible device and the right part shows a motion of the flexible device which is sensed and/or detected by the motion sensor while the device is bent. In this example, the motion sensor 7010 is located at a right lower portion of the device as shown in FIG. 8.

In the left parts of FIGS. 8(*a*) to 8(*c*), dotted arrows indicate reference directions of the motion sensor 7010. A long dotted arrow indicates a reference up-down direction of the motion sensor and a short dotted arrow indicates a reference left-rightward direction of the motion sensor.

When the device moves in a rightward direction in the x axis as shown in the left part of FIG. 8(*a*), the motion sensor 7010 may sense a movement of the device in a rightward direction in the x axis as shown in the right part of FIG. 8(*a*). However, due to bending, the motion sensor 7010 may sense a movement of the device in a different direction than the rightward direction as shown in FIGS. 8(*b*) and 8(*c*).

First, when the flexible device is bent as shown in FIG. 8(*b*), the motion sensor may rotate by about 90 degrees in a counterclockwise direction due to bending of the device. The reference direction of the motion sensor also changes as shown in FIG. 8(*b*). Accordingly, even though the device has moved in a rightward direction in the x axis as shown in the left part of FIG. 8(*b*), the motion sensor may sense the device as moving in a downward direction in the z axis as shown in the right part of FIG. 8(*b*).

In addition, when the flexible device is folded as shown in FIG. 8(*c*), the motion sensor may rotate by about 180 degrees in the x-axis direction due to bending of the device. The reference direction of the motion sensor also changes as shown in FIG. 8(*c*). Accordingly, even though the device has moved in a rightward direction in the x axis as shown in the left part of FIG. 8(*c*), the motion sensor may sense the device as moving in a rightward direction in the x axis as shown in the right part of FIG. 8(*c*).

Figure 9:
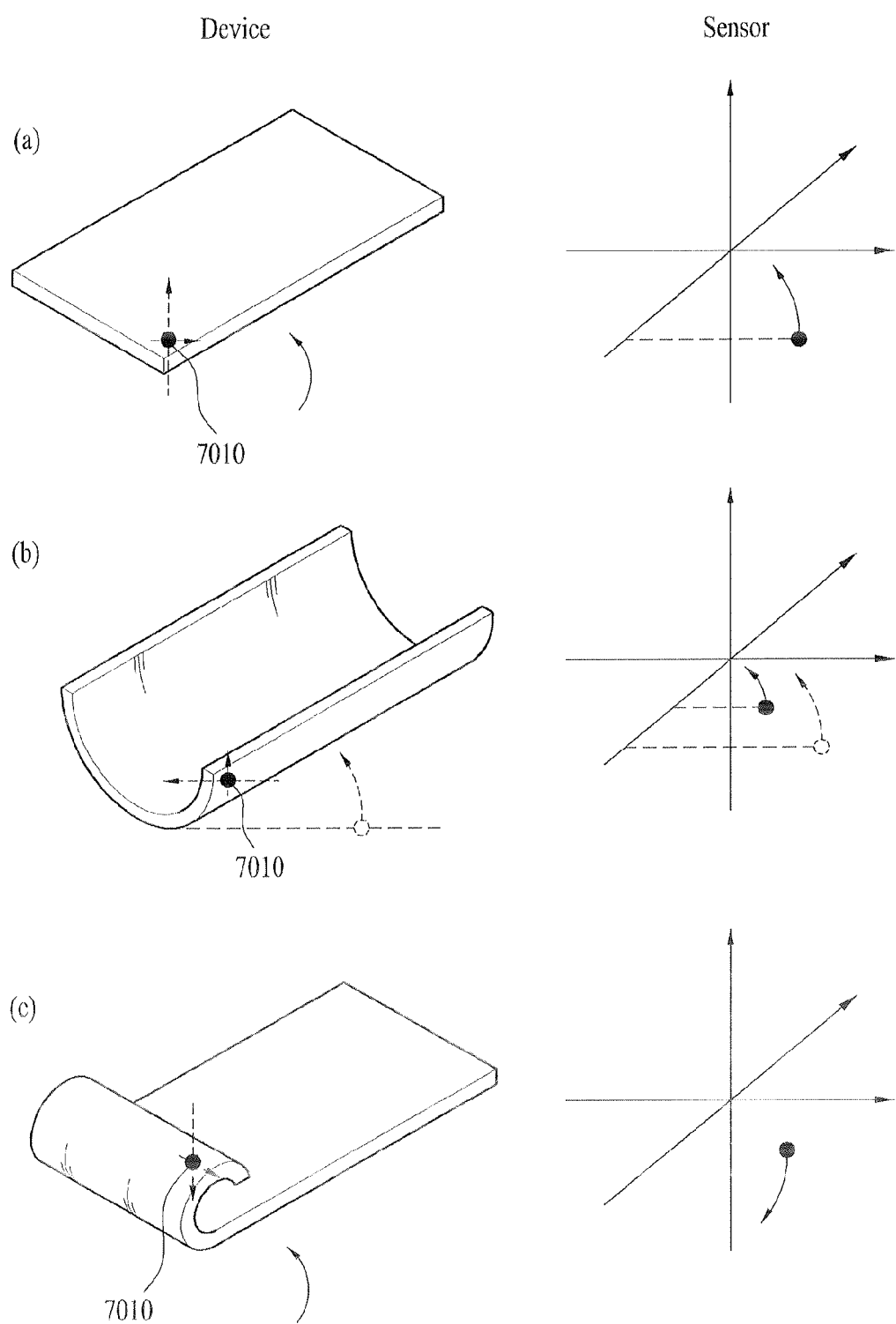
FIG. 9 illustrates a motion sensing operation of a flexible portable device according to another embodiment of the present invention.

FIG. 9 illustrates a motion sensing operation of a flexible portable device according to another embodiment of the present invention.

Specifically, FIG. 9 illustrates how the motion sensor senses a movement of the device when the user rotates the device in a counterclockwise direction about the y axis. The left part of FIG. 9 shows a bent form of the flexible device and the right part shows a motion of the flexible device which is sensed and/or detected by the motion sensor while the device is bent. In this example, the motion sensor 7010 is located at a right lower portion of the device as shown in FIG. 9.

In the left parts of FIGS. 9(a) to 9(c), dotted arrows indicate reference directions of the motion sensor 7010. A long dotted arrow indicates a reference up-down direction of the motion sensor and a short dotted arrow indicates a reference left-rightward direction of the motion sensor.

When the device rotates in a counterclockwise direction about the y axis as shown in the left part of FIG. 9(a), the motion sensor 7010 may sense a rotation of the device in a counterclockwise direction about the y axis as shown in the right part of FIG. 9(a). However, due to bending, the motion sensor 7010 may sense a rotation of the device in a different direction from the counterclockwise direction about the y axis as shown in FIGS. 9(b) and 9(c).

First, when the flexible device is bent as shown in FIG. 9(b), the motion sensor may rotate by about 90 degrees in a counterclockwise direction due to bending of the device. The reference direction of the motion sensor also changes as shown in FIG. 9(b). The distance between the motion sensor and the center of the device also decreases. Accordingly, even though the device has rotated by "A" in a counterclockwise direction about the y axis as shown in the left part of FIG. 9(b), the motion sensor may sense the device as being rotated by "a" in a counterclockwise direction about the y axis as shown in the right part of FIG. 9(b).

In addition, when the flexible device is folded as shown in FIG. 9(c), the motion sensor may rotate by about 180 degrees in the y-axis direction due to bending of the device. The reference direction of the motion sensor also changes as shown in FIG. 9(c). Accordingly, even though the device has rotated by "A" in a counterclockwise direction about the y axis as shown in the left part of FIG. 9(c), the motion sensor may sense the device as being rotated in a clockwise direction about the y axis as shown in the right part of FIG. 9(c).

As described above with reference to FIGS. 7 to 9, the motion sensor may incorrectly sense the motion of the flexible device when the device is bent. In this case, an error may occur when the device performs application control or display control using the conventional sensing scheme, leading to failure to provide a desired feedback to the user. Although the motion sensor is located at a right lower corner of the device in the examples of FIGS. 7 to 9, an error such as those of FIGS. 7 to 9 may occur regardless of where the motion sensor is located in the device.

For example, although the user has bent part of the device and rotated the display screen in a clockwise direction, the screen may rotate in a clockwise direction such that the displayed image is inverted. In addition, although the user has rotated the device by "A" in an application such as a car driving game to turn the car around a curve by "A", the car may turn in a curve only by "a" due to bending.

Accordingly, in the case of the flexible handheld device, there is a need to correct such a sensing error due to bending.

The following is a description of a method for correcting a motion sensing error due to bending when a flexible portable device is bent according to an embodiment of the present invention.

The present invention suggests a method in which a direction and a position of a motion sensor to which an initial reference direction and position of the motion sensor is changed due to bending of a device is acquired and reflected in motion sensing of the bent device. The position of the motion sensor which is changed due to bending may be represented by a vector. In addition, a direction, a position, and the like which need to be corrected since the motion sensor is affected by bending may be referred to as motion sensing correcting factors or correcting factors. In the following description, the motion sensing correcting factors may also be referred to as bending factors since it may be considered that correction is needed since the motion sensor is affected by bending.

Figure 10:
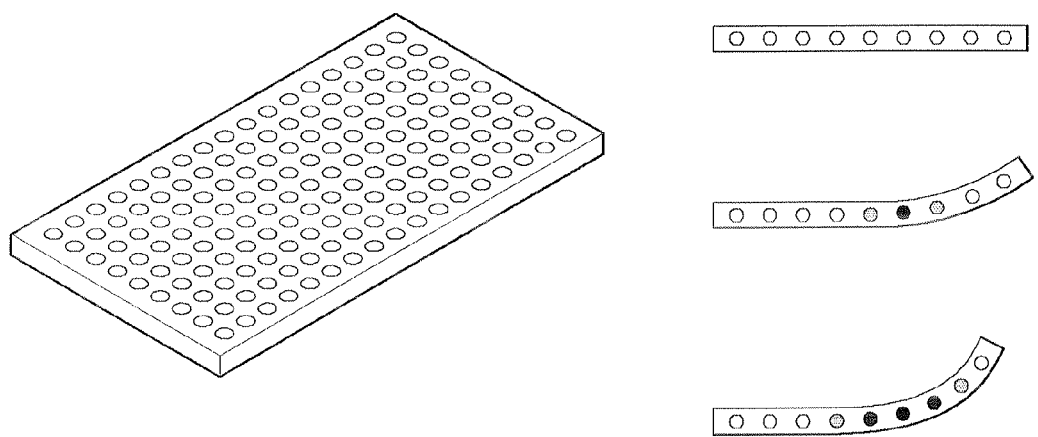
FIG. 10 illustrates a flexible portable device according to an embodiment of the present invention.

FIG. 10 illustrates a flexible portable device according to an embodiment of the present invention.

To acquire the correcting vector as described above, there is a need to detect the direction of bending and the extent of bending. Accordingly, the flexible portable device according to an embodiment of the present invention includes a bending sensor.

That is, the flexible portable device includes a bending sensor that can detect the bending of the device. The bending sensor may also be referred to as a bend sensor or a flex sensor.

As shown in FIG. 10, a sensor layer including a bending sensor may be provided inside or below a display. The sensor layer that senses bending may also serve as the bending sensor. The bending sensor may include electrode patterns as shown in FIG. 10. Each electrode includes a resistive material. The resistance of the electrode changes depending on the extent of bending such that current flowing through the sensor layer also changes depending on the extent of bending. Accordingly, the device can detect where and how much bending has occurred by detecting change of a current flowing in or voltage applied to the sensor layer.

As shown in the right part of FIG. 10, the number of electrodes that are affected by bending increases as the extent of bending increases. Accordingly, the device may sense the extent of bending through change in the current and may then calculate a bending angle at a specific portion through the sensed extent of bending. The device may acquire the distance and position of the bent part of the device according to the bending angle. The device may also acquire a direction change and a position change of the motion sensor included in the bent part of the device according to the bending angle.

Figure 11:
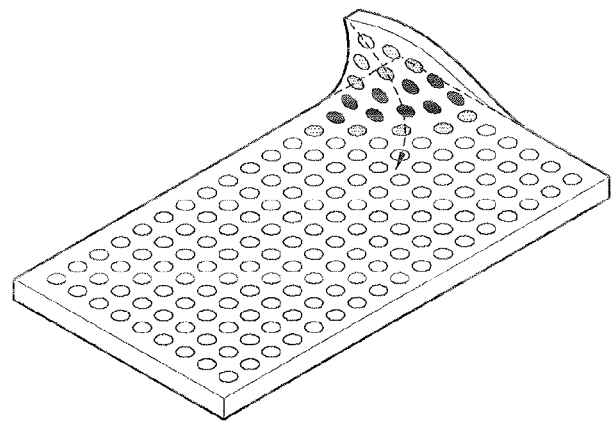
FIG. 11 illustrates a flexible portable device according to another embodiment of the present invention.

FIG. 11 illustrates a flexible portable device according to another embodiment of the present invention.

A change of the bending sensor at the bent part of the device is shown in FIG. 11. It is assumed in the example of FIG. 11 that a right upper corner of the flexible device is bent in a diagonal inner direction by an angle of 225 degrees.

When the device is bent in a diagonal inner direction as shown in FIG. 11, the sensor layer senses bending in a direction perpendicular to the surface of the bent portion as shown. Thus, it is possible to detect the direction of bending by determining a distribution of electrodes that are affected by bending in the sensor layer. In the case of FIG. 11, electrodes arranged in a dotted direction will be most greatly affected by bending. Thus, using a distribution of such electrodes, the device can detect that bending has occurred in a direction perpendicular to an array of the electrodes where bending is detected.

In FIGS. 10 and 11, a resistance change due to bending is indicated by color of the electrodes. A portion where greatest bending has occurred is indicated by a darkest color. In an embodiment, the device can determine that a portion of the device has been bent along a direction (denoted by an arrow in FIG. 11) perpendicular to the array of electrodes where greatest bending has occurred.

The methods for detecting the extent of bending and the direction of bending have been described above with reference to FIGS. 10 and 11. The methods are merely examples and the extent of bending and the direction of bending can also be detected using a bending sensor different from that described above. The flexible device according to the present invention may detect the extent/degree of bending and the direction of bending using any type of bending sensor and may acquire a bending vector using the detected extent/degree of bending and direction of bending.

In the case in which the motion sensor part of the device moves due to bending, the device needs to perform accurate device control. That is, when the motion sensor has sensed a motion, the device needs to perform device control as needed according to the motion. When the motion has occurred due to bending, the device needs to perform device control taking into consideration bending.

The influences of bending upon the motion sensor include a change in the direction of the motion sensor and a change in the position of the motion sensor. The following is a description of a change in the direction of the motion sensor and a change in the position of the motion sensor from among motion sensing correction factors.

Figure 12:
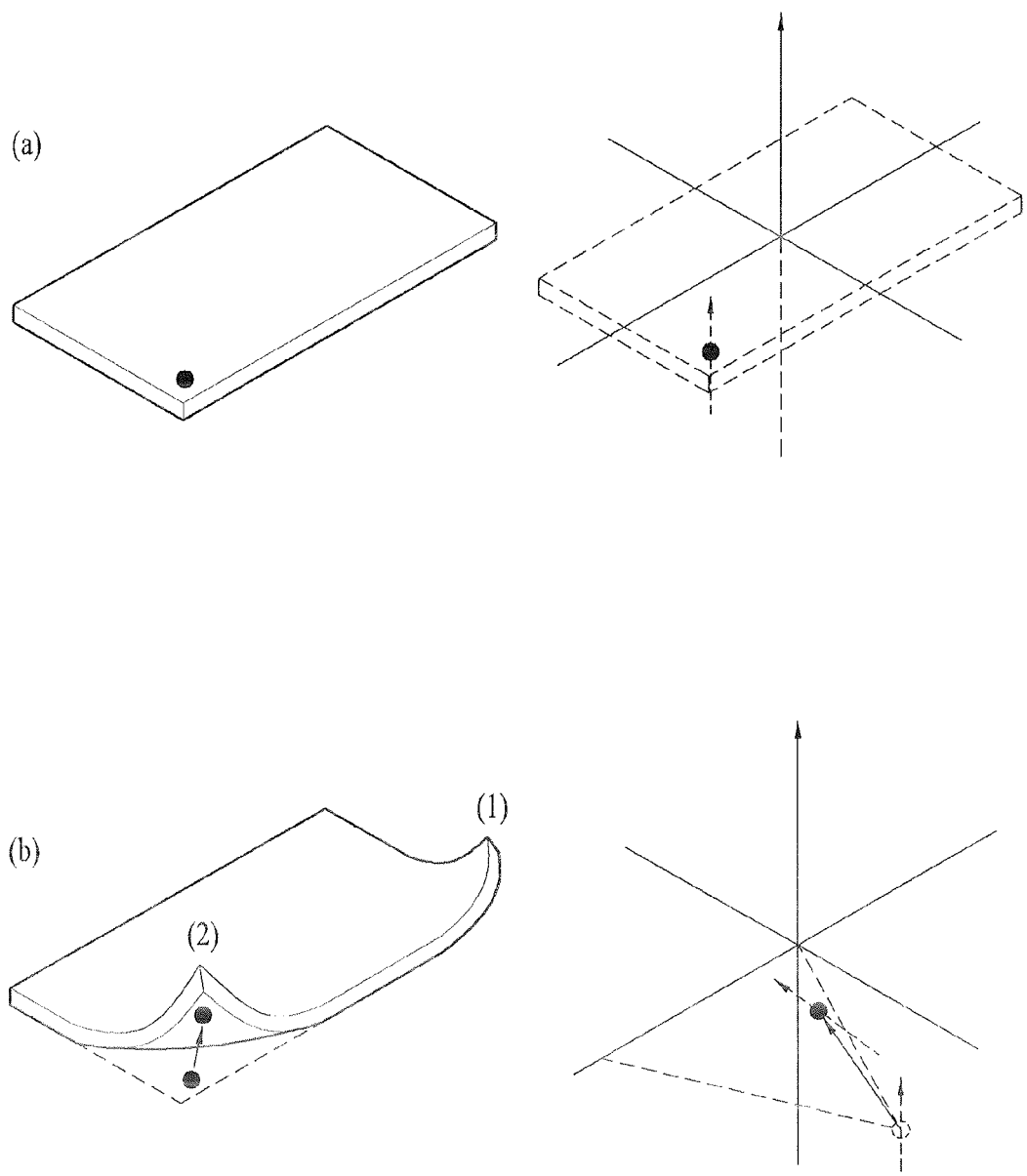
FIG. 12 illustrates a method for acquiring motion sensing correction factors according to an embodiment of the present invention.

FIG. 12 illustrates a method for acquiring motion sensing correction factors according to an embodiment of the present invention.

As shown in FIG. 12(a), the motion sensor can sense various motions with reference to a reference direction. Here, it is possible to sense a motion of the device from a direction, in which the motion sensor is located in the device, with reference to a reference direction that has been set by default. Even when the angle between the device and the Earth's surface has changed, the angle can be calculated using the gravity sensor. However, in this case, the angle can be calculated only when the reference direction or angle of the sensor has been set. Accordingly, when the flexible portable device has been bent due, there is a need to correct a sensed motion according to the reference direction or a change in the reference direction.

FIG. 12(b) illustrates that a reference direction of the sensor is changed when the flexible portable device is bent. A portion (1) of the device shown in FIG. 12(b) does not include the motion sensor. Accordingly, in the case in which the portion (1) is bent, the device may perform control based on bending and does not need to correct the direction of the motion sensor.

A portion (2) of the device of FIG. 12(b) includes the motion sensor. Accordingly, in the case in which the portion (2) is bent, the reference direction of the motion sensor changes as shown in FIG. 12(b). In this case, when an operation is applied to the device, the device may incorrectly identify the direction of the operation as described above with reference to FIGS. 7 to 9 and may perform control according to the incorrect direction. Accordingly, when the direction of the motion sensor has changed due to bending, the device needs to correct the direction of the motion sensor and to perform control based on the corrected direction.

The direction change of the motion sensor may be acquired by at least one of the bending sensor and the motion sensor. That is, the direction change of the motion sensor may be acquired using the direction and extent of bending sensed by the bending sensor as described above with reference to FIGS. 10 and 11. The direction change of the bending sensor may also be acquired using a change in the direction of the motion sensor which is sensed by the motion sensor. For example, a direction change of the motion sensor may be acquired using a change in an angle at which the gravity sensor is used or using the slope sensor. The direction change of the motion sensor may also be acquired using both the motion sensor and the bending sensor. The bending direction may be determined using the bending sensor and an angle change due to bending may be acquired using the motion sensor and a correct direction change of the motion sensor may then be acquired using the bending direction and the angle change. Alternatively, the bending direction may be determined using the motion sensor such as a geomagnetic sensor and the bending angle may be acquired using the bending sensor and the direction change of the motion sensor may then be acquired using the bending direction and the bending angle.

Figure 13:
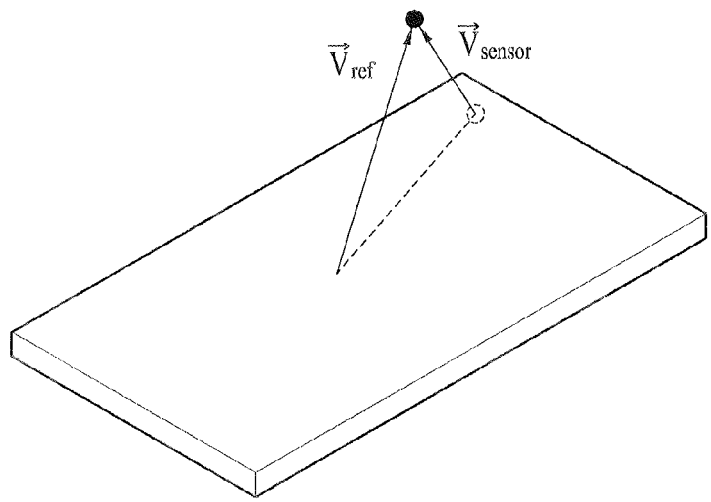
FIG. 13 illustrates a method for acquiring motion sensing correction factors according to another embodiment of the present invention.

FIG. 13 illustrates a method for acquiring motion sensing correction factors according to another embodiment of the present invention.

Not only a change in the direction of the motion sensor but also a change in the position of the motion sensor may cause erroneous control of the device as described above. Accordingly, when a portion of the flexible portable device including the motion sensor is bent, the device needs to determine a change in the position of the motion sensor and to perform control according to the determined position change.

The position change of the motion sensor may be represented by a change in the reference position. In an embodiment, the reference position may be the position of the sensor before bending or the position of a portion (central portion or inflexible portion) of the device which is unlikely to be bent or the position of which is unlikely to be changed due to bending.

In FIG. 13, Vector_sensor (V_sensor) denotes a change of the position of the motion sensor due to bending with respect to the position of the motion sensor before bending. Vector_ref (V_ref) denotes a change in the position of the motion sensor due to bending with respect to the reference position when the reference position is the position of the central portion of the device.

The position change of the motion sensor may be acquired using at least one of the motion sensor and the bending sensor. For example, once a change in the angle of a portion of the device due to bending is determined using the bending sensor, the device can determine a change in the position of the motion sensor using the bending position, the bending angle, and the size of the device. The device may also determine the changed position of the motion sensor by calculating the movement and distance of the motion sensor using the gyro sensor, the slope sensor, the geomagnetic sensor, and the like together with the motion sensor. The device may also determine the position change of the motion sensor using both the motion sensor and the bending sensor.

Figure 14:
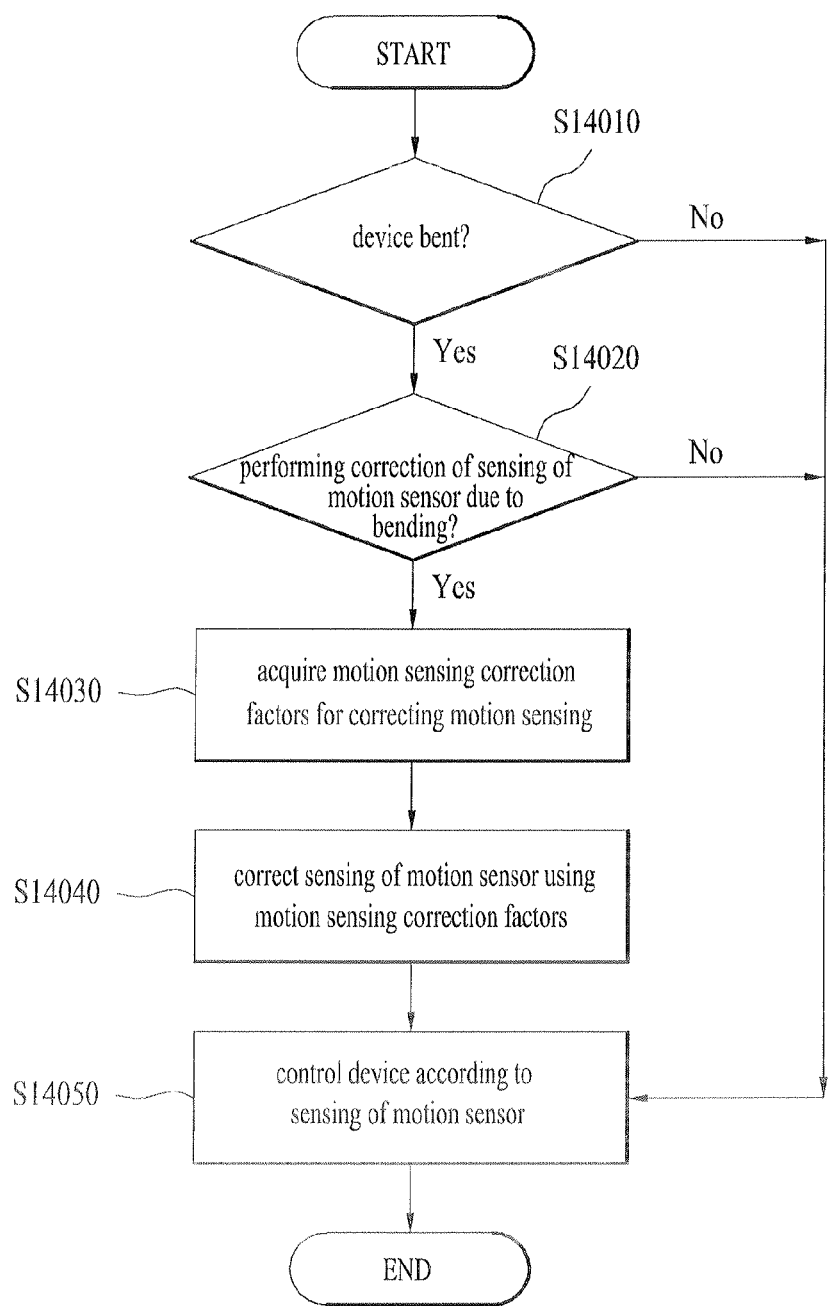
FIG. 14 is a flowchart illustrating a method for correcting sensing of a portable device according to an embodiment of the present invention.

FIG. 14 is a flowchart illustrating a method for correcting sensing of a portable device according to an embodiment of the present invention.

Specifically, FIG. 14 illustrates a method for correcting a sensing error of a motion sensor that has occurred due to bending of a flexible portable device.

First, the device detects whether bending of the device has occurred (S14010).

Sensing of the motion sensor need not always be reflected in control of the device. For example, when the device is off or when device motion sensing cannot be reflected in an application that is being executed, the motion sensor may be turned off or sensing by the motion sensor may be ignored even when the motion sensor has performed sensing. However, an undesired change may occur in motion sensing due to bending occurring before or when the device is controlled according to motion sensing. Thus, to reflect motion sensing, it is necessary to determine whether or not bending has occurred before reflecting motion sensing. For example, when a motion has been sensed although bending has not occurred in the device, the device needs to be controlled according to the sensed motion. When bending has occurred in the device, the device determines whether or not there is a need to perform control according to bending. Thus, the device first determines whether or not bending has occurred in the device. Whether or not bending has occurred in the device may be detected using the bending sensor. The device may also perform device or application control based on bending of the device. The motion sensor may refer to the sensor unit above-mentioned.

As described above, the motion sensor and sensing results of the motion sensor described above also include sensors, which can identify a motion of the device or a motion with respect to the device, and sensing results of the sensors. The sensing results may include at least one of a position change, an orientation change, a direction change, a speed change, an acceleration change, and an angular speed change of the device. The sensing results may also include sensing results of other sensors described as an example in this specification.

The device determines whether to perform correction of sensing of the motion sensor due to bending (S14020). As described above, when the device does not use sensing of the motion sensor, for example, when the device is off, there is no need to perform correction of sensing of the motion sensor due to bending. When a portion of the device, which is not associated with motion sensing (for example, the portion (1) of FIG. 12(b)) is bent, there is also no need to perform correction of sensing of the motion sensor. Accordingly, the device determines whether or not there is a need to perform motion sensing correction due to bending and may perform device control according to sensing of the motion sensor without correction upon determining that there is no need to perform motion sensing correction. Of course, the device may perform device control based on bending.

The device may determine whether or not there is a need to correct sensing of the motion sensor using at least one of the bending sensor and the motion sensor. For example, when the bending sensor has not sensed bending although the motion sensor is performing motion sensing, the device may perform control according to the sensed motion. Alternatively, when the motion sensor does not perform motion sensing although the bending sensor has sensed bending, the device may determine that a portion of the device which does not include the motion sensor has been bent and thus may perform device control according to sensing of the motion sensor without sensing correction. The device may also determine whether or not there is a need to perform sensing correction according to the application or the operating state and mode of the device.

The device acquires motion sensing correction factors for performing motion sensing correction due to bending (S14030).

The motion sensing correction factors include a numerical value, a signal, data, and information which are required for motion sensing correction due to bending of the device as described above. In an embodiment, the motion sensing correction factors may include at least one of a direction change and a position change of the motion sensor due to bending of the device. These changes take the form of a numerical value, a signal, data, and information and can be acquired by the sensor, the controller, or the application.

Specifically, the motion sensing correction factors may be acquired using at least one of a motion sensor and a bending sensor. For example, it is possible to acquire a direction change of the motion sensor due to bending using the motion sensor and to acquire a position change of the motion sensor due to bending using the bending sensor. It is also possible to acquire a position change of the motion sensor due to bending using the motion sensor and to acquire a direction change of the motion sensor due to bending using the bending sensor. It is also possible to acquire a position change and a direction change of the motion sensor due to bending using the motion sensor and to acquire a position change and a direction change of the motion sensor due to bending using the bending sensor. The device may also calculate the motion sensing correction factors using a sensing result output from at least one of the motion sensor and the bending sensor through the controller. For an additional description of acquisition of motion sensing correction factors, reference can be made to the above description of FIGS. 10 to 13.

The device can correct sensing of the motion sensor using the motion sensing correction factors (S14040).

Specifically, the device may correct sensing which is currently being performed by the motion sensor or sensing which is to be newly performed by the motion sensor using the motion sensing correction factors acquired as described above.

In an embodiment, the device may correct sensing of the motion sensor by resetting at least one of the reference direction and the reference position of the motion sensor. For example, when the reference direction or the reference position of the motion sensor has been changed, the device may change the sensing references of the motion sensor to the changed direction and position. Thereafter, the device can directly use sensing of the motion sensor.

In another embodiment, the device may correct the sensing result of the motion sensor using previously acquired motion sensing correction factors. Unlike the above embodiment, since additional bending may often occur, only the motion sensing correction factors may be acquired without resetting reference values of the sensors, the motion sensing result may be corrected using the acquired motion sensing correction factors, and the device may then be controlled using the corrected motion sensing result.

The device may correct the sensing result of the motion sensor by directly controlling the motion sensor and may also correct the sensing result of the motion sensor using a sensing result of the motion sensor through the controller or the application.

The device may perform device control according to a sensing result of the motion sensor (S14050).

Here, the sensing result of the motion sensor indicates a corrected sensing result of the motion sensor. That is, in one embodiment, in the case in which the sensing references of the motion sensor have been corrected, the corrected sensing result of the motion sensor indicates a result of sensing using the corrected sensing references and, in another embodiment, in the case in which the sensing result of the motion sensor has been corrected, the corrected sensing result of the motion sensor indicates the corrected sensing result. The device may perform device control according to sensing results of various motion sensors as described above. The device may perform device control according to a sensing result of the motion sensor without correcting sensing of the motion sensor when the device has not been bent or when the device has been bent without affecting sensing of the motion sensor.

By controlling the flexible device in this manner, it is possible to prevent the occurrence of a motion sensing error due to bending of the flexible device or prevent malfunction of the device due to the motion sensing error.

The control method shown in the flowchart of FIG. 14 may be performed by the controller of the device using at least one of the sensors (the bending sensor, the motion sensor, and the like) provided in the device. The control method of FIG. 14 may also be performed by an application that is running on the controller. That is, an application running on the controller may perform the control method by controlling the sensors included in the device, sensing or sensing results of the sensors through the controller.

Figure 15:
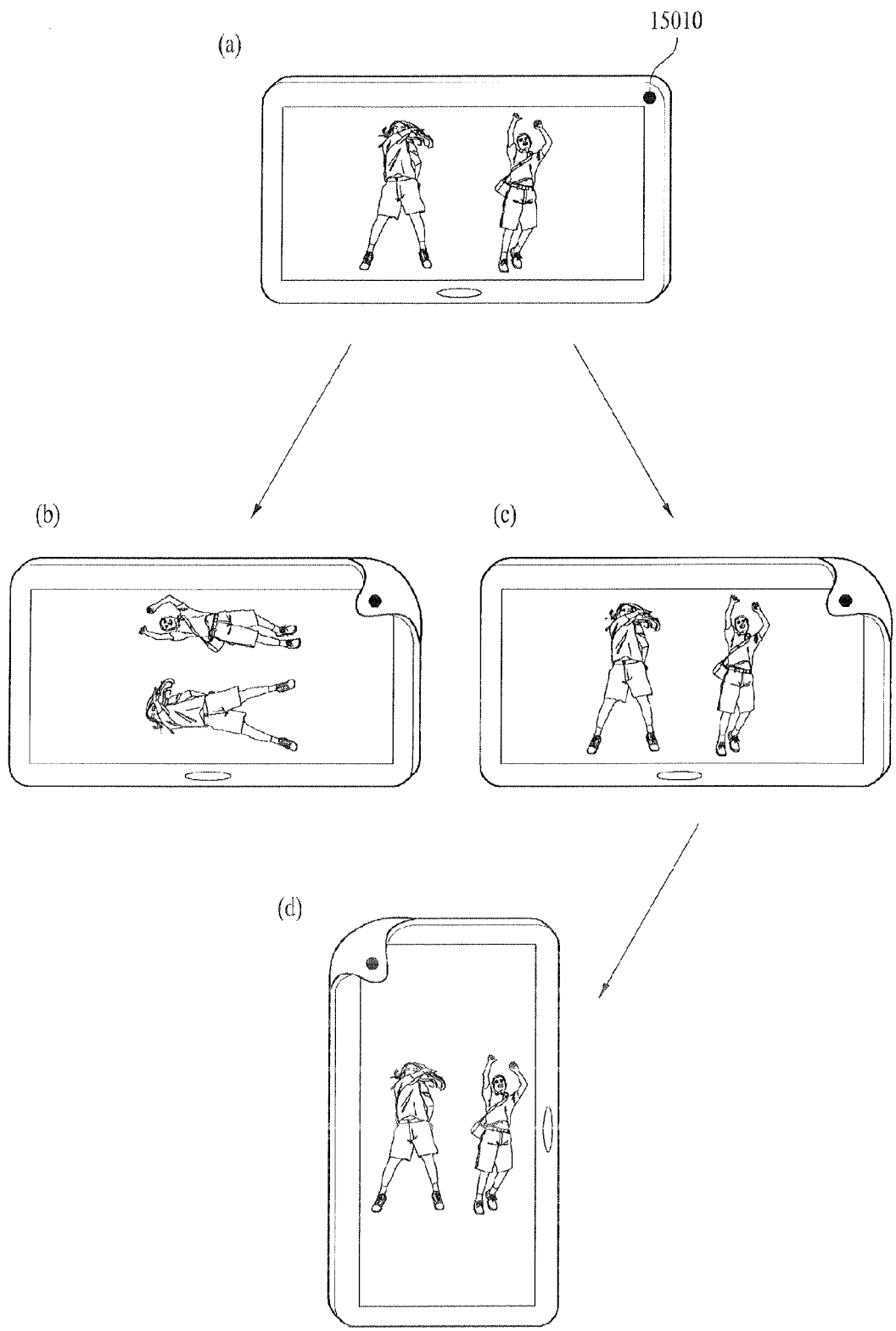
FIG. 15 illustrates a control operation of a device according to an embodiment of the present invention.

FIG. 15 illustrates a control operation of a device according to an embodiment of the present invention.

Specifically, FIG. 15 illustrates display control of a flexible portable device. As shown in FIG. 15(a), the device may include a motion sensor 15010 at a right upper portion of the display and may also include a bending sensor, although not illustrated. The following is a description of how the device performs display control when a right upper portion of the device shown in FIG. 15(a) is bent or folded.

FIG. 15(b) illustrates the case in which the sensing correction method of the present invention is not used. The direction of the sensor has changed due to bending of the motion sensor. Here, the device may determine that the device has moved and thus may change the screen axis of the display. However, sensing of the motion sensor in this case has resulted from bending rather than motion of the device. Thus, considerable user inconvenience is caused since the display axis has changed although the user has bent a corner of the device without moving the device.

FIG. 15(c) illustrates the case in which the sensing correction method of the present invention is used. In the case of FIG. 15(c), the device may detect bending and may determine that a sensing result of the motion sensor has been generated due to bending and may then correct the sensing result accordingly. The state of the display remains unchanged since the device performs device control according to the corrected sensing result. Thereafter, even when the device is rotated as shown in FIG. 15(d), the device corrects an error due to bending of the device and then changes the display axis in response to rotation of the device as shown in FIG. 15(d), thereby maintaining the optimal display state.

Figure 16:
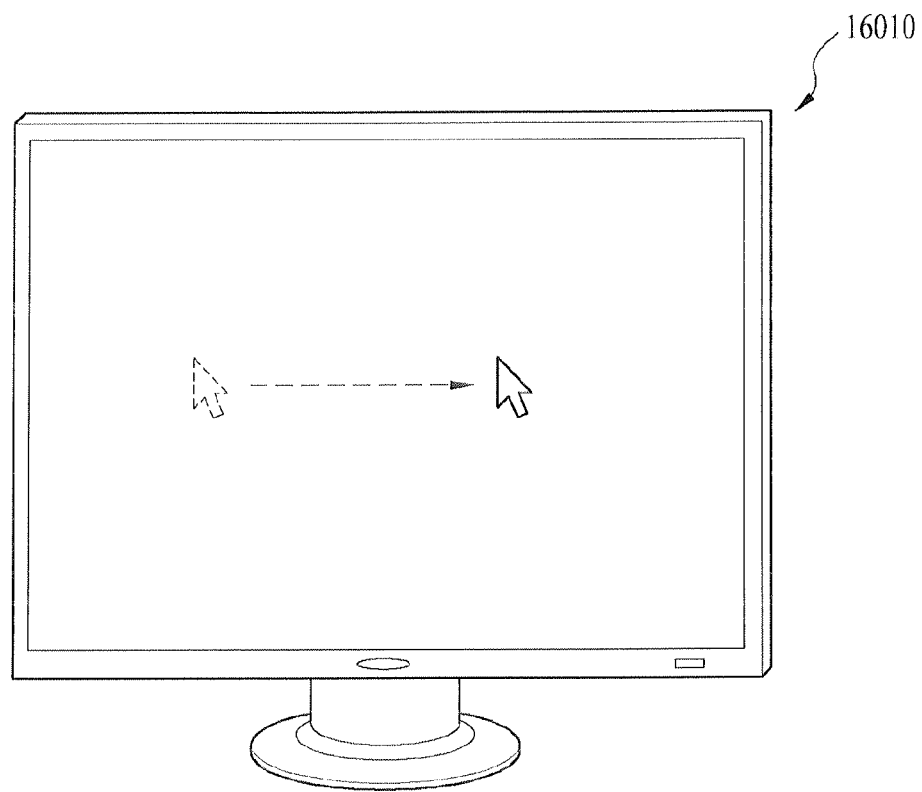
FIG. 16 illustrates a control operation of a device according to another embodiment of the present invention.
Figure 16:
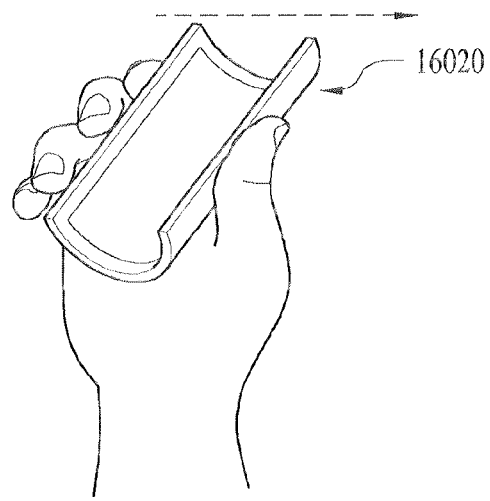

FIG. 16 illustrates a control operation of a device according to another embodiment of the present invention.

Specifically, FIG. 16 illustrates an embodiment in which another device is controlled using the flexible portable device. Recently, various local wireless communication standards such as Bluetooth have been developed to allow the user to control another electronic device using a handheld device such as a cellular phone. More specifically, FIG. 16 illustrates an embodiment in which the user controls a display device such as a monitor of a computer or a television using a flexible portable device as a remote control or a remote mouse.

In the embodiment of FIG. 16, a cursor of the television monitor moves according to movement of the portable device. In this case, the flexible portable device may be bent before or while the device is used. To correctly control another electronic device connected to the flexible portable device, it is necessary to correctly identify a motion of the portable device even when the portable device has been bent. Accordingly, even when the flexible portable device has been bent, it is possible to correctly control an electronic device such as a television connected to the flexible portable device by correcting an error due to bending using the sensing correction method suggested in the present invention. That is, even when the portable device is bent while or before the portable device moves horizontally to the right as shown in FIG. 16, it is possible to generate and transmit a control signal for moving a cursor in the intended right horizontal direction on the screen of the television without causing an error regardless of where the motion sensor is included in the device.

In addition, while the external device is controlled using the portable device, a slope change of the portable device may occur as described above with reference to FIG. 5 together with bending of the device as shown in FIG. 16. In this case, the portable device may simultaneously correct the effects of the slope change and bending. When a slope change, which is not associated with an input of movement in an intended direction, is sensed using the motion sensor, the portable device may correct the slope change or angle and additionally correct a sensing change of the motion sensor due to bending. Especially, in this case, the portable device needs to determine whether a slope change or the like sensed by the motion sensor is due to bending or due to motion. When the change sensed by the motion sensor of the device is due to motion, the device may perform the operation of step S14050 of the flowchart of FIG. 14. When the change sensed by the motion sensor of the device is due to both bending and motion, the device may perform the entire procedure of the flowchart of FIG. 14. Here, an operation for correcting slope change of the motion sensor or the like may be included in the device control operation of step S14050.

The device control method of FIG. 14 may further include the step of correcting a motion which is unnecessary to control another device when the motion has been detected in the embodiment of FIG. 16. Specifically, in the case in which moving the device in a specific direction serves as an input command as described above with reference to FIG. 5, the device control method of FIG. 14 may further include the step of correcting an incorrectly input command such as rotation other than a movement input of the device to a correct input command. Even when the user involuntarily rotates or bends the portable device while moving the portable device, it is possible to correct the effects of bending and correct such an involuntary motion such as rotation according to the method of FIG. 14 and to generate and transmit a control signal according to movement of the device in a direction desired by the user.

Figure 17:
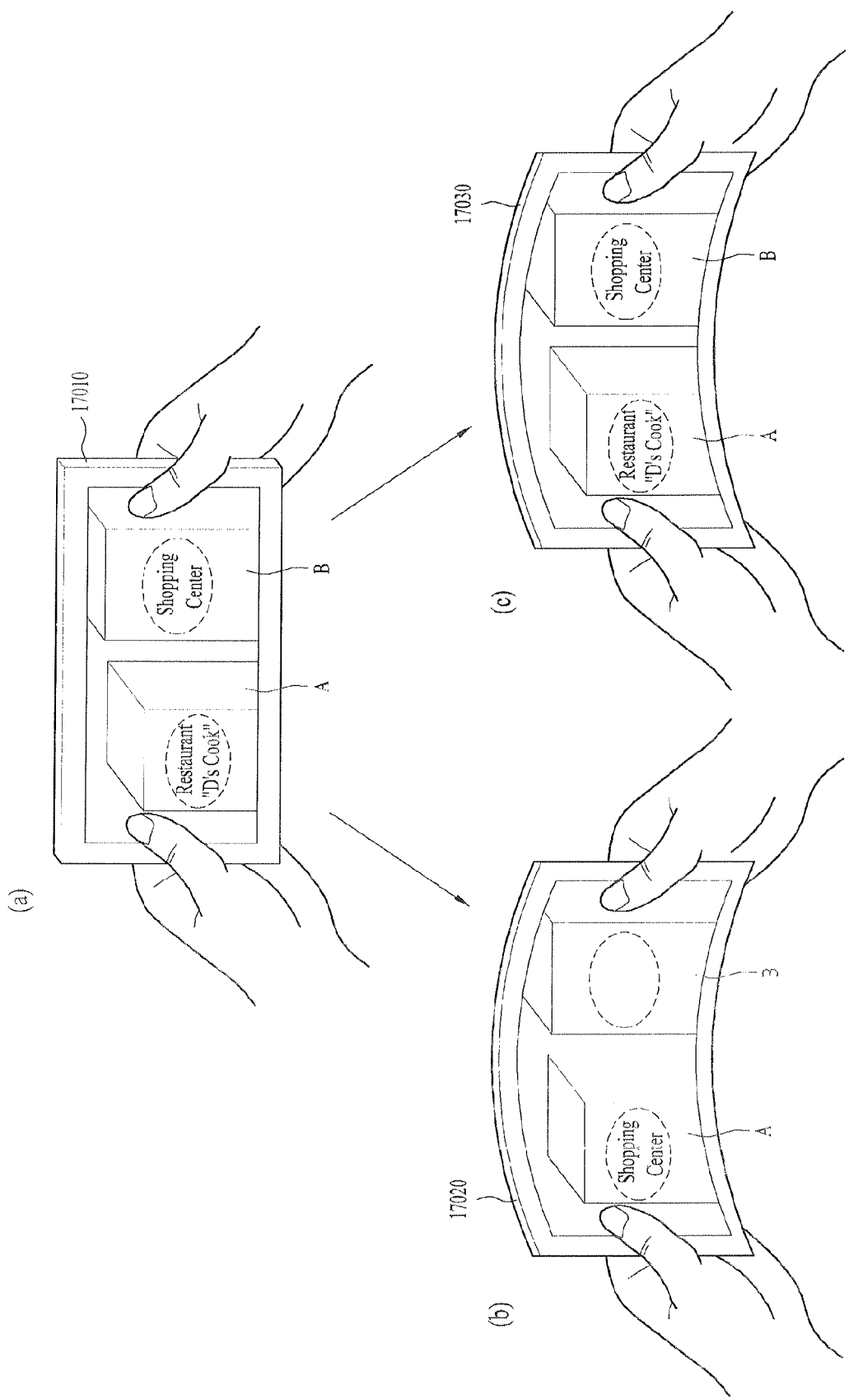
FIG. 17 illustrates a control operation of a device according to another embodiment.

FIG. 17 illustrates a control operation of a device according to another embodiment.

Specifically, FIG. 17 illustrates a flexible portable device that uses an augmented reality application. As a field of virtual reality, augmented reality provides an interface that overlays a virtual object or information onto a real environment to allow the virtual object to be perceived as an object present in a real environment.

As shown in FIG. 17(a), when the user directs a handheld device toward a street after executing an augmented reality application, the device may display an image of the street in an overlapping manner on a display using a camera. When the display is transparent, content of the application may overlap with an appearance of the street which is displayed on the transparent display using the camera. That is, an image captured through the camera is identified and surrounding information of the image acquired using position information and direction information acquired by the device is displayed so as to overlap with the identified image. The flexible portable device can be used while bending a portion of the display as described above.

When the augmented reality application is used, it is possible to visually provide the user with position information of a service of interest using the display and position information that the device has acquired using the motion sensor. In the example of FIG. 17(a), the flexible portable device 17010 is positioned such that the camera is directed towards building A and building B. When a service or location desired by the user is shopping or a restaurant, the flexible portable device 17010 provides information regarding the building. In the example of FIG. 17(*a*), the device 17010 displays a restaurant "D's Cook" as building A and a shopping center as building B.

While the flexible portable device 17010 is used, the user may voluntarily or involuntarily bend the device as shown in FIGS. 17(*b*) and 17(*c*). When sensing of the motion sensor such as a position sensor or a direction sensor has changed due to bending, the device may determine that the direction of the device has changed even though the direction in which the camera of the device is directed has not actually changed. However, building A and building B are still displayed since the primary direction of the device has not actually changed.

FIG. 17(*b*) illustrates a flexible portable device 17020 on which building A and building B are still displayed. In the case of FIG. 17(*b*), the motion sensor may sense that the direction of the device 17020 has rotated to the right due to bending of the device. The device 17020 may determine that the device has rotated to the right and thus may display position information, which is to be displayed when the device has rotated to the right, on the display such that the position information overlaps with building A and building B. Thus, the device 17020 may allow different building information to overlap with building A and building B in which the device is actually directed. That is, the device may determine that the direction of the device has rotated and may allow information of building B to overlap with building A and information of another building to overlap with building B on the display, thereby causing considerable user inconvenience.

FIG. 17(*c*) illustrates a flexible portable device 17030 that uses a sensing correction method according to the present invention. In the case of FIG. 17(*c*), building A and building B are still displayed since the primary direction of the device 17030 has not actually changed. When the device 17030 has been bent, the device determines that a sensed motion of the device is due to bending and thus does not perform device control according to the motion as in the case of FIG. 17(*b*). When the sensed motion of the device is due to bending, the device 17030 corrects the motion due to bending according to the method of the flowchart of FIG. 14 and performs device control according to the corrected motion. Accordingly, the device 17030 does not perform an erroneous operation as in the case of FIG. 17(*b*) and thus can provide information desired by the user as shown in FIG. 17(*c*) and can also perform, when a motion of the device 17030 is sensed, control according to the sensed motion.

FIG. 18 illustrates a control operation of a device according to an embodiment of the present invention.

Specifically, FIG. 18(*a*) illustrates a flexible portable device 18010 in which a position and direction based application is being executed. In FIG. 18, a constellation application that displays a constellation, which is present in the same direction as the direction from the user to the device, is illustrated as an example of the position and direction based application.

As described above, the device may determine the position, direction, and angle of the device using the motion sensor. For example, the device may determine a position of the user on the Earth using the GPS sensor and may determine the orientation of the device or user using the geomagnetic sensor. The device may also determine the angle between the device and the Earth's surface using the gravity sensor or the slope sensor. Thus, using the constellation application, the device 18010 may display, to the user, a constellation that is located at a position that the user currently indicates using the device as shown in FIG. 18(*a*). When the direction or angle of the device 18010 has changed, the device 18010 may identify the motion of the device and display a constellation located at coordinates that have changed accordingly.

FIGS. 18(*a*) and 18(*c*) illustrate the case in which the user voluntarily or involuntarily bends the device on which a constellation application is being executed.

In an example, the device may be bent as shown in FIG. 18(*b*) such that a right side of the device, where a geomagnetic sensor that senses orientation is provided, is also bent. In this case, the device may determine that the orientation of the device has changed although the direction or orientation in which the user directs the display has not changed. Accordingly, in this case, the device 18020 may determine that the device 18020 has moved to the right side of the direction originally intended by the user and thus may display a constellation located at the right side. However, the same image as that shown in FIG. 18(*a*) should be displayed since the device 18020 has merely been bent without changing the primary direction of the device 18020.

FIG. 18(*c*) illustrates the case in which a sensing correction method according to an embodiment of the present invention is used. In the example of FIG. 18(*c*), the user also voluntarily or involuntarily bends the device 18030. In this case, the device 18030 determines whether a motion sensed by the geomagnetic sensor is due to bending or due to a motion of the device. Accordingly, when bending has occurred as shown in FIG. 18(*c*), the device determines that the direction of the device has changed due to bending rather than due to motion of the device and thus corrects the change of the direction as described above with reference to FIG. 14. Accordingly, the device can display the constellation at the same coordinates as in the case of FIG. 18(*a*) without changing the display as in the case of FIG. 18(*b*). When a motion is sensed as the user has moved the device 18030 with the device being bent, the device may correct (or negate) the effects of bending and perform device control according to the motion of the device as described above with reference to FIG. 14. Accordingly, the device 18030 can display a constellation located at coordinates in the correct direction of the device as the device moves while the device is bent.

In the case in which the flexible portable device provides services as shown in FIGS. 15 to 18, the device control operation described with reference to FIGS. 15 to 18 is added to the device control operation in the method shown in the flowchart of FIG. 14.

For example, in the case of FIG. 15, the device corrects a sensing result of the motion sensor such that the sensing result of the motion sensor indicates a change in the direction of the device. Accordingly, the device rotates the direction of the display according to the direction of rotation of the device determined according to the corrected sensing result of the motion sensor as described above with reference to FIG. 15, thereby allowing the user to view the same image even when the device rotates.

In the case of FIG. 16, the device corrects sensing of the motion sensor such that the corrected sensing result of the motion sensor indicates a movement of the device in a horizontal direction (arrow direction). That is, when the device is bent before or while the device moves in a horizontal direction, the device acquires motion sensing correction factors due to bending and corrects sensing of the motion sensor using the acquired correction factors. The device may then negate the effects of bending of the device according to the corrected sensing result of the motion sensor and transmit a television control signal according to the horizontal movement of the device. In addition, even when a motion such as rotation other than the horizontal movement has been sensed, the device can correct the sensed motion to a motion required for a control operation, which is being performed, and transmit a control signal according to the horizontal movement of the device.

In the case of FIG. 17, a portion of the device different from that shown in FIG. 17 may be bent. Specifically, bending may change the angle of the camera or may affect a direction of the device sensed by the motion sensor. When the device is bent before or while the augmented reality application is executed, the device may acquire motion sensing correction factors due to bending and may correct the sensing result of the motion sensor using the acquired correction factors. Accordingly, even when the device is bent, the device can provide display required for the augmented reality application without generating an error due to bending.

In the case of FIG. 18, a portion of the device different from that shown in FIG. 18 may be bent. Even when the different portion of the device is bent before or while the application is executed, the device may acquire motion sensing correction factors due to bending and correct the sensing result of the motion sensor using the acquired correction factors. Accordingly, even when the device is bent, the device can perform motion sensing required for the application and execute and display the application without an error.

According to the present invention, even when a flexible portable device is bent while the device is being used, it is possible to correct an erroneous operation of the device due to bending. Specifically, a device, which includes various motion sensors, can correctly perform device control and application control using the motion sensors even when the device is bent.

As is apparent from the above description, the embodiments of the present invention have a variety of advantages. For example, a portable device including a flexible display or a flexible portable device can be correctly operated and controlled even though the portable device is flexible.

Specifically, even when the flexible portable device is bent, the flexible portable device can be correctly operated by correcting the effects of bending.

The present invention can be partially or fully applied to an electronic device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a portable device, the method comprising:
   detecting, by the portable device, that bending of at least one portion of the portable device has occurred, the portable device including at least one motion sensor configured to detect a movement of the portable device;
   determining whether motion sensing correction of the bent portable device is necessary by detecting whether the at least one bent portion of the portable device affects motion sensing of the at least one motion sensor;
   acquiring at least one motion sensing correction factor for performing the motion sensing correction due to the bending based on the determination result;
   performing motion sensing correction of the at least one motion sensor using the at least one motion sensing correction factor; and
   carrying out an operation in the bent portable device according to the corrected motion sensing of the at least one motion sensor when the determination result indicates that the motion sensing correction is necessary or according to uncorrected motion sensing of the at least one motion sensor when the determination result indicates that the motion sensing correction is not necessary.

2. The method according to claim 1, wherein the at least one motion sensing correction factor includes at least one of a direction change and a position change of the at least one motion sensor due to the bending of the portable device.

3. The method according to claim 1, wherein the performing the motion sensing correction of the at least one motion sensor includes:
   resetting a sensing reference of the at least one motion sensor using the at least one motion sensing correction factor; and
   performing motion sensing according to the reset sensing reference.

4. The method according to claim 1, wherein the performing the motion sensing correction of the at least one motion sensor includes:
   performing motion sensing; and
   correcting a result of the motion sensing using the at least one motion sensing correction factor.

5. The method according to claim 1, wherein the motion sensing includes at least one of sensing of a position change, a slope change, an orientation change, a direction change, a speed change, an acceleration change, and an angular speed change of the portable device.

6. The method according to claim 1, wherein the controlling the bent portable device according to the corrected motion sensing includes controlling a display of the portable device according to a rotation of the portable device sensed by the portable device.

7. The method according to claim 1, wherein the controlling the bent portable device according to the corrected motion sensing includes transmitting a control signal of an external device according to a movement of the portable device sensed by the portable device.

8. The method according to claim 1, wherein the controlling the bent portable device according to the corrected motion sensing includes controlling an application that is being executed by the portable device according to the motion sensing.

9. A portable device comprising:
   a bending sensor configured to detect that bending of at least one portion of the portable device has occurred;
   at least one motion sensor configured to detect a movement of the portable device; and
   a controller configured to determine whether motion sensing correction of the bent portable device is necessary by detecting whether the at least one bent portion of the portable device affects motion sensing of the at least one motion sensor,
   wherein the controller acquires at least one motion sensing correction factor for performing the motion sensing correction due to the bending, and corrects motion sensing of the at least one motion sensor using the at least one motion sensing correction factor, and
   wherein the controller carries out an operation in the portable device according to the corrected motion sensing of the motion sensor when the motion sensing correction is necessary or according to uncorrected motion sensing of the motion sensor when the motion sensing correction is not necessary.

10. The portable device according to claim 9, wherein the at least one motion sensing correction factor includes at least one of a direction change and a position change of the at least one motion sensor due to the bending of the portable device.

11. The portable device according to claim 9, wherein the controller resets a sensing reference of the at least one motion sensor using the at least one motion sensing correction factor and controls the at least one motion sensor to perform the motion sensing according to the reset sensing reference.

12. The portable device according to claim 9, wherein, when the at least one motion sensor performs the motion sensing, the controller corrects a result of the motion sensing using the at least one motion sensing correction factor.

13. The portable device according to claim 9, wherein the at least one motion sensor includes at least one of a GPS sensor, a slope sensor, a geomagnetic sensor, a gravity sensor, a gyro sensor, and an acceleration sensor.

14. The portable device according to claim 9, further comprising a display, wherein the controller controls the display of the portable device according to a rotation of the portable device sensed by the portable device.

15. The portable device according to claim 9, wherein the controller transmits a control signal of an external device according to a movement of the portable device sensed by the portable device.

16. The portable device according to claim 9, wherein the controller controls an application that is being executed by the portable device according to the motion sensing.

* * * * *